US011879317B2

(12) United States Patent
Hunter et al.

(10) Patent No.: US 11,879,317 B2
(45) Date of Patent: Jan. 23, 2024

(54) FLOW RATE OPTIMIZATION DURING SIMULTANEOUS MULTI-WELL STIMULATION TREATMENTS

(71) Applicant: Halliburton Energy Services, Inc., Houston, TX (US)

(72) Inventors: Timothy Holiman Hunter, Duncan, OK (US); Stanley Vernon Stephenson, Duncan, OK (US); Mikko Jaaskelainen, Katy, TX (US); Ubong Akpan Inyang, Humble, TX (US); Joshua Lane Camp, Friendswood, TX (US); Tirumani N. Swaminathan, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 246 days.

(21) Appl. No.: 17/284,019

(22) PCT Filed: Dec. 21, 2018

(86) PCT No.: PCT/US2018/067215
§ 371 (c)(1),
(2) Date: Apr. 9, 2021

(87) PCT Pub. No.: WO2020/131109
PCT Pub. Date: Jun. 25, 2020

(65) Prior Publication Data
US 2021/0332683 A1 Oct. 28, 2021

(51) Int. Cl.
*E21B 43/26* (2006.01)
*E21B 47/003* (2012.01)
(Continued)

(52) U.S. Cl.
CPC ............. *E21B 43/26* (2013.01); *E21B 43/12* (2013.01); *E21B 47/003* (2020.05); *G01D 5/26* (2013.01);
(Continued)

(58) Field of Classification Search
CPC .......... E21B 43/26; E21B 49/00; E21B 47/00; E21B 2200/20; G01V 2210/646;
(Continued)

(56) References Cited

U.S. PATENT DOCUMENTS 6,935,424 B2 8/2005 Lehman et al.
7,090,017 B2 8/2006 Justus et al.
(Continued)

FOREIGN PATENT DOCUMENTS

CA 2044877 A1 12/1991
WO WO 2014/165380 A1 10/2014
(Continued)

OTHER PUBLICATIONS

Evans et al., "Eagle Ford Case History: Evaluation of Diversion Techniques to Increase Stimulation Effectiveness," *SPE/AAPG/SEG Unconventional Resources Technology Conference*, Aug. 103, 2016, San Antonio, Texas, USA (URTEC-2016-2459883).
International Search Report and The Written Opinion of the International Search Authority, or the Declaration, dated Sep. 19, 2019, PCT/US2018/067215, 13 pages, ISA/KR.

*Primary Examiner* — Zakiya W Bates
(74) *Attorney, Agent, or Firm* — Kilpatrick Townsend & Stockton LLP

(57) ABSTRACT

System and methods of controlling fracture growth during multi-well stimulation treatments. The flow distribution of treatment fluid injected into first and second well formation entry points along multiple wellbores is monitored during a current stage of a multi-well, multistage stimulation treatment. Upon determining the fracture growth and/or monitored flow distribution meets a threshold, a remainder of the (Continued)

current stage is partitioned into a plurality of treatment cycles and at least one diversion phase. A portion of the fluid to be injected into the first well and/or second well formation entry points is allocated to each of the treatment cycles of the partitioned stage. The treatment cycles are performed for the remainder of the current stage using the treatment fluid allocated to each treatment cycle, wherein the flow distribution is adjusted so as not to meet the threshold.

18 Claims, 10 Drawing Sheets

(51) Int. Cl.
    *G01D 5/26*     (2006.01)
    *G01V 1/18*     (2006.01)
    *G01V 1/42*     (2006.01)
    *E21B 43/12*     (2006.01)

(52) U.S. Cl.
    CPC ............... *G01V 1/181* (2013.01); *G01V 1/42* (2013.01); *G01V 2210/1234* (2013.01); *G01V 2210/1299* (2013.01); *G01V 2210/1429* (2013.01); *G01V 2210/646* (2013.01)

(58) Field of Classification Search
    CPC . G01V 1/40; G01V 1/42; G01V 1/303; G01V 1/301; G01V 1/306; G01V 1/30
    See application file for complete search history.

(56) References Cited

U.S. PATENT DOCUMENTS

| | | |
|---|---|---|
| 7,451,812 B2 | 11/2008 | Cooper et al. |
| 7,516,793 B2 | 4/2009 | Dykstra |
| 7,841,394 B2 | 11/2010 | McNeel et al. |
| 7,908,230 B2 | 3/2011 | Bailey et al. |
| 7,946,340 B2 | 5/2011 | Surjaatmadja et al. |
| 8,078,328 B2 | 12/2011 | Malki et al. |
| 8,893,787 B2 | 11/2014 | Tips et al. |
| 9,140,109 B2 | 9/2015 | Suarez-Rivera et al. |
| 9,262,713 B2 | 2/2016 | Shelley et al. |
| 9,353,613 B2 | 5/2016 | Soliman et al. |
| 9,695,681 B2 | 7/2017 | Portman |
| 9,863,228 B2 | 1/2018 | Shampine et al. |
| 2014/0352968 A1 | 12/2014 | Pitcher et al. |
| 2015/0075778 A1 | 3/2015 | Walters et al. |
| 2016/0282507 A1 | 9/2016 | Mayerhofer et al. |
| 2016/0326859 A1 | 11/2016 | Crews et al. |
| 2017/0108605 A1 | 4/2017 | Walters et al. |

FOREIGN PATENT DOCUMENTS

| | | | |
|---|---|---|---|
| WO | WO 2015/108563 A1 | 7/2015 | |
| WO | WO-2015178931 A1 * | 11/2015 | ......... E21B 41/0092 |
| WO | WO 2016/039773 A1 | 3/2016 | |
| WO | WO 2018/022044 A1 | 2/2018 | |
| WO | WO 2018/022045 A1 | 2/2018 | |
| WO | WO 2018/084870 A1 | 5/2018 | |

\* cited by examiner

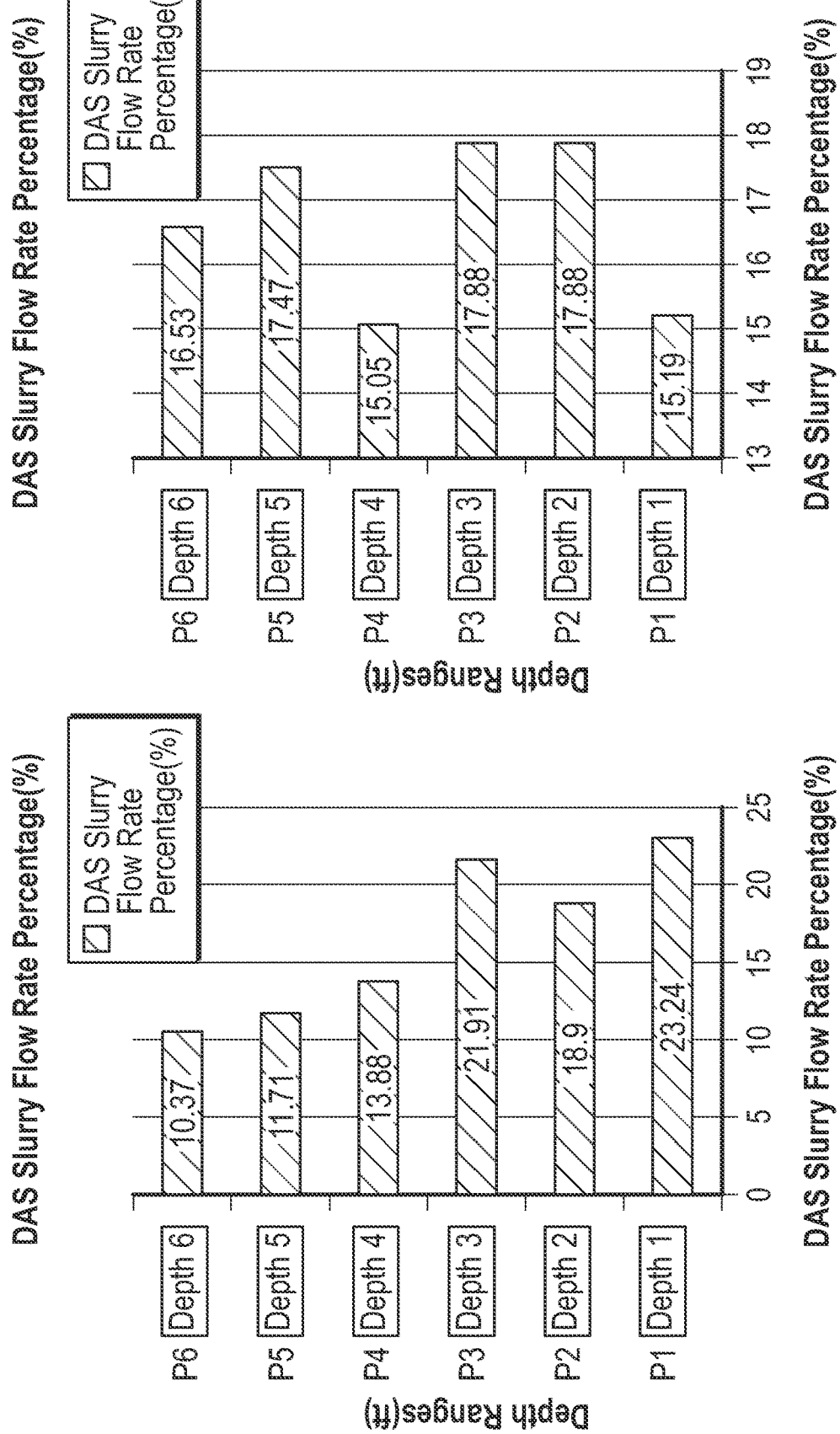

FLOW RATE OPTIMIZATION DURING SIMULTANEOUS MULTI-WELL STIMULATION TREATMENTS

PRIORITY

The present application is a U.S. National Stage patent application of International Patent Application No. PCT/US2018/067215, filed on Dec. 11, 2018, the benefit of which is claimed and the disclosure of which is incorporated herein by reference in its entirety.

FIELD OF THE DISCLOSURE

The present disclosure relates generally to the design of multi-well hydraulic fracturing treatments for stimulating hydrocarbon production from subsurface reservoirs, and particularly, to techniques for controlling the placement and distribution of injected fluids during such multi-well stimulation treatments.

BACKGROUND

In the oil and gas industry, a well that is not producing as expected may need stimulation to increase the production of subsurface hydrocarbon deposits, such as oil and natural gas. Hydraulic fracturing is a type of stimulation treatment that has long been used for well stimulation in unconventional reservoirs. A multistage stimulation treatment operation may involve drilling a horizontal wellbore and injecting treatment fluid into a surrounding formation in multiple stages via a series of perforations or formation entry points along a path of a wellbore through the formation. During each of the stimulation treatment, different types of fracturing fluids, proppant materials (e.g., sand), additives and/or other materials may be pumped into the formation via the entry points or perforations at high pressures and/or rates to initiate and propagate fractures within the formation to a desired extent. With advancements in horizontal well drilling and multistage hydraulic fracturing of unconventional reservoirs, there is a greater need for ways to accurately monitor and control fracture growth by monitoring and adjusting downhole flow and distribution of injected fluids across different perforation clusters. With the advent of simultaneous multi-well stimulation, it is even more important to monitor and control fracture growth and the impact of fractures extending from one well to another.

A way to monitor the downhole environment during fracturing operation is to use fiber-optic sensors disposed in one or more of the wells. For example, the fiber-optic sensors may be components of a distributed acoustic sensing (DAS), distributed strain sensing, and/or distributed temperature sensing (DTS) subsystems of the injection system. Such sensors may serve as real-time data sources for various types of downhole measurements and diagnostic information pertaining to stimulation treatments. The data collected downhole by such sensors may include, for example, real-time flow distribution for monitoring the fracture operation.

Diversion is a technique used in injection treatments to facilitate uniform distribution of treatment fluid over each stage of the treatment. Diversion may involve the delivery of diverter material into the wellbore to divert injected treatment fluids toward formation entry points along the wellbore path that are receiving inadequate treatment. Examples of such diverter material include, but are not limited to, viscous foams, particulates, gels, benzoic acid and other chemical diverters. Traditionally, operational decisions related to the use of diversion technology for a given treatment stage, including when and how much diverter is used, are made a priori according to a predefined treatment schedule. However, conventional diversion techniques based on such predefined treatment schedules fail to account for actual operating conditions that affect the downhole flow distribution of the treatment fluid over the course of the stimulation treatment.

BRIEF DESCRIPTION OF THE DRAWINGS

FIGS. 9B and 9C are flow distributions calculated according to certian illustrative embodiments of the present disclosure.

DESCRIPTION OF ILLUSTRATIVE EMBODIMENTS

Figure 1:
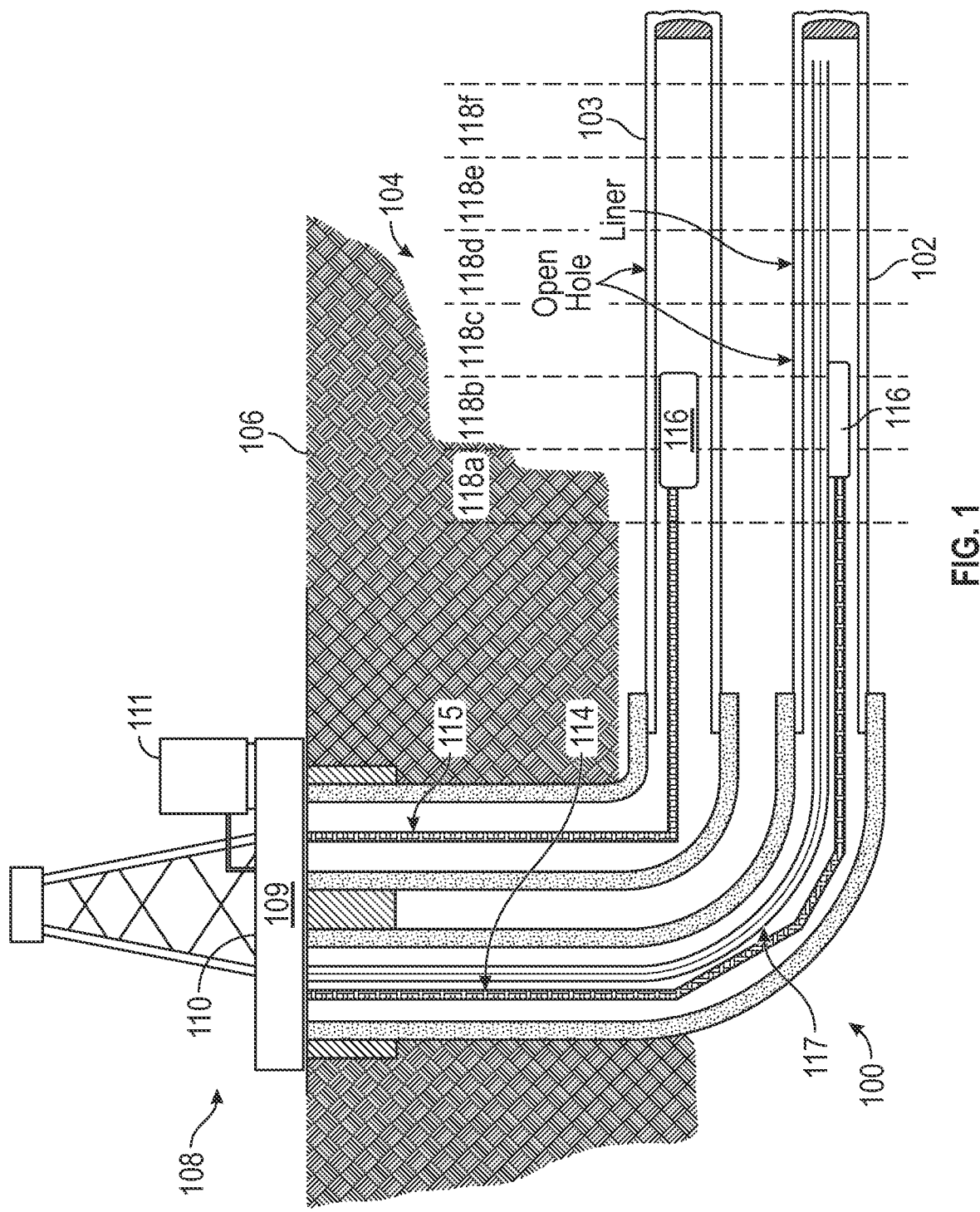
FIG. 1 is a diagram of an illustrative well system for a multi-well multistage stimulation treatment of a hydrocarbon reservoir formation.

Embodiments of the present disclosure relate to monitoring and control of fracture growth and diverter placement for multi-well multistage stimulation treatments. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As will be described in further detail below, embodiments of the present disclosure may be used to monitor and control fracture growth in multiple wells by making operational decisions regarding the use of diversion to adjust the flow distribution of treatment fluid during a simultaneous multi-well stimulation treatment. In simultaneous stimulation operations as described herein, more than one well is pumped at the same time from the same equipment and/or crew. For example, such multi-well stimulation treatments may involve injecting the treatment fluid into a subsurface formation via a plurality of formation entry points (or "perforation clusters") along multiple wellbore paths within the subsurface formation. In one or more embodiments, real-time measurements and diagnostic data obtained from one or more data sources at the wellsite may be used to monitor the growth of fractures in one or more wells and the downhole flow distribution of the injected treatment fluid during each stage of the multi-well stimulation treatment. Such multi-well wellsite data may be used to perform a quantitative and/or a qualitative analysis of various factors affecting the fracture growth and downhole flow distributions in multiple wells under current operating conditions. The results of the analysis may then be used to determine the impact of fracture growth on one well from another well. This fracture impact analysis may then be used to determine when and how to deploy diverter material into multiple wellbores in order to appropriately partition or otherwise modify a baseline treatment schedule to control subsequent fracture growth in multiple wells.

Adjustments to the multi-well stimulation treatment, including changes to the amount of diverter that is deployed, may be made while the treatment is in progress in order to improve the flow distribution and perforation cluster efficiency and control fracture growth. The flow distribution and perforation cluster efficiency may be improved by using the diverter to effectively plug certain formation entry points or perforation clusters along the wellbore path and thereby divert the injected treatment fluid toward other formation entry points receiving inadequate treatment to grow fractures at those entry points. This allows the coverage of the multi-well stimulation treatment and the recovery of hydrocarbons from the reservoir formation to be increased. The ability to make such adjustments in real-time may also allow wellsite operators to reduce the amount of time and materials needed to perform each stage of the multi-well treatment, thereby reducing the overall costs of the treatment.

Illustrative embodiments and related methodologies of the present disclosure are described below in reference to the examples shown in FIGS. 1-10 as they might be employed, for example, in a computer system for real-time monitoring and control of fracture growth and diversion placement during multi-well stimulation treatments. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. While these examples may be described in the context of a multistage multi-well hydraulic fracturing treatment, it should be appreciated that the real-time flow distribution on fracture monitoring and diversion control techniques are not intended to be limited thereto and that these techniques may be applied to other types of stimulation treatments, e.g., matrix acidizing treatments.

FIG. 1 is a diagram illustrating an example of a well system 100 for performing a multistage multi-well stimulation treatment of a hydrocarbon reservoir formation. As shown in the example of FIG. 1, well system 100 includes a first wellbore 102 and a second wellbore 103 in a subsurface formation 104 beneath a surface 106 of the wellsite. Wellbores 102 and 103 as shown in the example of FIG. 1 includes horizontal wellbores. However, it should be appreciated that embodiments are not limited thereto and that well system 100 may include any combination of horizontal, vertical, slant, curved, and/or other wellbore orientations. The subsurface formation 104 may include a reservoir that contains hydrocarbon resources, such as oil, natural gas, and/or others. For example, the subsurface formation 104 may be a rock formation (e.g., shale, coal, sandstone, granite, and/or others) that includes hydrocarbon deposits, such as oil and natural gas. In some cases, the subsurface formation 104 may be a tight gas formation that includes low permeability rock (e.g., shale, coal, and/or others). The subsurface formation 104 may be composed of naturally fractured rock and/or natural rock formations that are not fractured to any significant degree.

Well system 100 also includes a well pad 109 and fluid injection system 108 for injecting treatment fluid, e.g., hydraulic fracturing fluid, into the subsurface formation 104 over multiple sections 118a, 118b, 118c, 118d, 118e and 118f (collectively referred to herein as "sections 118") of the wellbores 102 and 103, as will be described in further detail below. Each of the sections 118 may correspond to, for example, a different stage or interval of the multi-well multistage stimulation treatment. The boundaries of the respective sections 118 and corresponding treatment stages/intervals along the length of the wellbores 102 and 103 may be delineated by, for example, the locations of bridge plugs, packers and/or other types of equipment in the wellbores 102 and 103 (although, in other embodiments, they may not be delineated by any physical structure/equipment). Additionally, or alternatively, the sections 118 and corresponding treatment stages may be delineated by particular features of the subsurface formation 104. Although six sections are shown in FIG. 1, it should be appreciated that any number of sections and/or treatment stages may be used as desired for a particular implementation. Furthermore, each of the sections 118 may have different widths or may be uniformly distributed along wellbores 102 and 103. The wellbores 102 and 103 have open hole portions 119 and liners 120.

As shown in FIG. 1, injection system 108 includes an injection control subsystem 111, a signaling subsystem 114 installed in the first wellbore 102 and a signaling subsystem 115 installed in the second wellbore 103, and one or more injection tools 116 installed in wellbores 102 and 103. The injection control subsystem 111 can communicate with the injection tools 116 from a surface 110 of the wellbore 102 and 103 via the signaling subsystems 114 and 115 respectively. Although not shown in FIG. 1, injection system 108 may include additional and/or different features for implementing the flow distribution monitoring and diversion control techniques disclosed herein. For example, the injection system 108 may include any number of computing subsystems, communication subsystems, pumping subsystems, monitoring subsystems, blenders, manifolds, pressure and rate monitoring subsystems, and/or other features as desired for a particular implementation.

In some implementations, the wellbore 102 may include a fiber-optic sensor network 117 for collecting real-time measurements of acoustic intensity and/or thermal energy and/or other measurements downhole during the multi-well stimulation treatment. For example, the fiber-optic sensor network 117 may be components of a distributed acoustic sensing (DAS), and/or distributed strain sensing (DSS), and/or point pressure measurement sensing, and/or distributed temperature sensing (DTS) subsystems of the injection system 108. Each subsystem may consist of a fiber optic interrogator located on the surface and it may be connected to an optical fiber within the fiber optic sensor network. The fiber optic interrogator may operate in e.g. a pulsed state where one or several optical light pulses are sent down the optical fiber and back scattered or back reflected light may be collected, or the fiber optic interrogator may operate in a continuous wave mode where the light wavelength may be constant or swept over a wavelength range. The fiber optic interrogator may operate based on intensity, wavelength, frequency, phased based detection schemes as well as interferometric sensing based on homodyne, heterodyne, pseudo-random coding, random coding and/or cross-correlation schemes. The fiber optic interrogator may e.g. use Rayleigh scattering, coherent Rayleigh scattering, Brillouin scattering or Raman scattering sensing principles. The optical fibers may be multi-mode fibers, un-modified or modified single mode fibers where modifications may include periodic or non-periodic variations to the core or refractive index of the core.

In certain illustrative embodiments, the fiber-optic sensors 117 are adaptable to obtain real-time measurements and diagnostic data of both the first and/or second wellbores and/or additional production or monitoring wellbores during multi-well multistage stimulation treatments. Real-time measurement data may be, for example optical intensity measurements, optical wavelength measurements, optical frequency or phase measurements where the optical measurements can be used to derive temperature, pressure, acoustic, strain, micro-seismic, micro-deformation, or other formation related properties. Diagnostic data may be, for example, temperature vs. depth profiles, strain vs. depth profiles, acoustic intensity and/or frequency depth profiles, micro-seismic vs. 3D space in the vicinity of a treatment or monitoring wellbore, micro-deformation vs. 3D space in the vicinity of a treatment or monitoring wellbore, surface and/or subsurface pressure and this data can be used to monitor down-hole changes over time and space as the fracking operation progresses. The diagnostic data can be refined to e.g. flow rates across perforation clusters, fracture sizes/orientation and fracture growth rates, cross-well fluid and fracture communication, fracture complexity near wellbore and fracture complexity in the reservoir, fracture and fluid communication between formation layers in the reservoir where the refined diagnostics data can be used to control fracturing operations during single well and/or multi well fracturing operations. However, it should be appreciated that embodiments are not limited thereto and that a fiber-optic sensor network 117 can be disposed in the second wellbore 103 or a fiber-optic sensor network can be disposed in each wellbore 102 and 103 and/or additional wellbores (not shown). In some implementations, the injection control subsystem 111 may be communicatively coupled to the fiber-optic sensor network 117. In some implementations, the fiber-optic sensor network 117 may be communicatively coupled to a separate processing and control unit (not shown). In some implementations, the injection control subsystem 111 may be communicatively coupled to a remote computing system (not shown) for exchanging information via a network for purposes of monitoring and controlling wellsite operations, including operations related to the stimulation treatment. Such a network may be, for example and without limitation, a local area network, medium area network, and/or a wide area network, e.g., the Internet.

Thus, in the fiber-optics example above, the downhole data collected by the fiber-optic sensor network 117 may be transmitted to the injection control subsystem 111 and use the downhole data that it receives via the fiber-optic network 117 to perform real-time fracture mapping and/or real-time fracturing pressure interpretation using any of various data analysis techniques for monitoring stress fields around hydraulic fractures in wellbores 102 and 103.

In order to monitor subsurface characteristics during a fracturing operation in certain embodiments, the fiber optic network may collect and process data from one or several of the subsystems. For example, distributed acoustic sensing data using e.g. coherent Rayleigh sensing principles can be collected e.g. every three feet along the fiber with a pulse repetition rate ranging from 1 kHz to 100 kHz. The acoustic data can be used for detecting microseismic events during the fracturing operation where pressure and/or shear waves from the microseismic events are mapped along the length of the optical fiber. The location of these events can be triangulated as the travel velocity of pressure and shear waves are known and travel velocity models can be refined by e.g. monitoring perforation events during the fracturing operation.

The microseismic events are caused by the fracturing operation as fractures are propagating in the formation and the rock breaks apart or rock planes slip/shift and result in micro-seismic events, and mapping these events in space and time will generate an event cloud of microseismic events in space. Various mathematical and/or statistical means can be used to calculate the azimuth of this event cloud, and the calculation can be done substantially in real-time. Similarly, the length of the event cloud and the height of the event cloud can be used as indications of fracture height and fracture length, or fracture network height and fracture network length or fracture network width. Similarly, mapping the growth rates of these properties (i.e., fracture mapping) will allow for an approximation of when a certain area or volume will be fractured. The fracture azimuth, fracture length or fracture network length, fracture height or fracture network height, and fracture width or fracture network width can also be used to determine if a fracturing operation is going as planned, or if a corrective action should be considered. The corrective action may include changing flow rates, pressures, proppant concentration, chemical concentration, diverter concentration and/or other parameters.

In certain embodiments, the measured acoustic frequency and amplitude between e.g. 0 Hz to 1 kHz can be used to identify fluid flow in the subsurface and what perforation clusters fracture fluid enters. Correlation to physics based or data driven models can be used to allocate fluid flow vs. acoustic energy. Other frequency ranges can be used as well, including octave bands where different frequency ranges are combined into single values through various mathematical means in order to reduce data density. These single values can be tied to models, and the output of e.g. flow models can be used to determine the need for corrective actions. The measured acoustic information can be used as an indication of how the fluid is distributed between perforation clusters and corrective actions can be taken if the fluid distribution deviates from planned values.

Similarly, the low frequency portion of collected Rayleigh based data (e.g. 0.001 Hz-10 Hz) or Brillouin based sensing data can be used to measure strain over time in either the well being fractured or a well close by where monitoring systems can be used to collect data that can be used to infer fluid cross well communication and/or formation movement and/or changes in stress/strain induced by fracturing operations. Parts of the reservoir and formation will mechanically move as a stage is being fractured, and this movement may result in strain that can be measured. Distributed strain sensing data can be used to model fracture characteristics including fracture height, width and length depending on sensing fiber placement. The measured strain can be measured and compared with earth models, and deviations between measured data and earth models for the planned fracturing operation may then indicate that the fracturing operation doesn't deliver the desired outcome thus triggering the need for corrective actions.

Distributed Temperature Sensing (DTS) data can be used in certain embodiments to identify where fluid is flowing. The temperature in the reservoir is normally higher than the temperature at the surface so a cool thermal slug or fluid volume can be monitored as it travels down from the surface to the perforated section of the well. Velocity and/or amplitude can be monitored and tracked, and can be used as indications of what perforations the fluid is entering, and corrective actions may be taken if undesired fluid distributions are identified during the fracturing operation. One example would be when toe clusters stay at a constant temperature or at geothermal temperature while other clusters towards the heel of the well cools down as this would be an indication that there is no fluid movement of the cooler fracturing fluid past the toe clusters. It may then be desirable to e.g. pump diverter to change the fluid distribution between clusters.

Pressure can also be measured at surface and/or in the subsurface domain, and the pressure measurements may be done with a frequency of up to 1,000 measurements per second or more. The measured pressure changes as fractures open and/or as pump flow rates change and/or as formation properties changes as a result of the fracturing operation, and this pressure can be measured and correlated with various distributed measurements. Corrective actions may be taken if the pressure deviates from modeled results.

A combination of various sensing methods can be used to monitor fluid flow from the well bore into the formation through the perforation clusters and to monitor formation responses and fracture and/or fracture network growth over time. Predictive models can be updated with this information, and set-points for fracturing operations can be determined in order to achieve specific reservoir properties like e.g. high fracture network complexity or certain fracture network dimensions. These setpoints can then be used to control and change flow rates, pressures, proppant concentrations, chemical concentrations and/or diverter concentration etc. to influence the outcome of a fracturing operation in a single well or simultaneous multi-well stimulation operations. A combination of measurements may be combined to further refine and constrain models, and a correlation between microseismic events like e.g. measured/calculated fracture event cloud size/movement and/or strain events and/or pressure events over time can be used to improve the accuracy of the models. E.g. microseismic velocity models and/or fracture size and/or fracture growth rates may be updated based on e.g. the measured strain information from a Rayleigh or coherent Rayleigh or Brillouin based system.

During each stage of the multi-well stimulation treatment, the injection system 108 may alter stresses and create a multitude of fractures in the subsurface formation 104 by injecting the treatment fluid into the surrounding subsurface formation 104 via a plurality of formation entry points along a portion of wellbores 102 and 103 (e.g., along one or more of sections 118). The fluid may be injected through any combination of one or more valves of the injection tools 116. The injection tools 116 may include numerous components including, but not limited to, valves, sliding sleeves, actuators, ports, and/or other features that communicate treatment fluid from working strings disposed within wellbores 102 and 103 into the subsurface formation 104 via the formation entry points. The formation entry points may include, for example, open-hole sections along an uncased portion of the wellbore path, a cluster of perforations along a cased portion of the wellbore path, ports of a sliding sleeve completion device along the wellbore path, slots of a perforated liner along the wellbore path, or any combination of the foregoing.

The injection tools 116 may also be used to perform diversion in order to adjust the downhole flow distribution of the treatment fluid across the plurality of formation entry points. Thus, the flow of fluid and delivery of diverter material into the subsurface formation 104 during the multi-well stimulation treatment may be controlled by the configuration of the injection tools 116. The diverter material injected into the subsurface formation 104 may be, for example, a degradable polymer. Examples of different degradable polymer materials that may be used include, but are not limited to, polysaccharides; lignosulfonates; chitins; chitosans; proteins; proteinous materials; fatty alcohols; fatty esters; fatty acid salts; aliphatic polyesters; poly(lactides); poly(glycolides); poly(ε-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides;

polyhydroxyalkanoates; polyethyleneterephthalates; polybutyleneterephthalates; polyethylenenaphthalenates, and copolymers, blends, derivatives, or combinations thereof. However, it should be appreciated that embodiments of the present disclosure are not intended to be limited thereto and that other types of diverter materials may also be used.

In alternative embodiments, during multi-well stimulation different operations can be performed at the same or different times. For examples, a diverter treatment could be dropped into a first and second well simultaneously or at different times based on the real time data obtained from fiber optics, micro seismic, tiltmeter, etc (and that this diverter can be injected at different points on the fracture network). In other embodiments, the multi-well treatment may be used to prevent fracture driven interactions (sometimes called frac hits or well bashing) or to maximize coverage of the drainage area.

In addition to diverters, other techniques may be used such as, for example, pumping rate changes, fluid changes/recipe changes (e.g., switching from crosslink fluid to fluid reducers) or switching the viscosity of the crosslink fluid being pumped), and changing the proppant type, concentration or distribution.

In one or more embodiments, the valves, ports, and/or other features of the injection tools 116 can be configured to control the location, rate, orientation, and/or other properties of fluid flow between the wellbores 102 and 103 and the subsurface formation 104. The injection tools 116 may include multiple tools coupled by sections of tubing, pipe, or another type of conduit. The injection tools may be isolated in the wellbore 102 and 103 by packers or other devices installed in wellbores 102 and 103.

In some implementations, the injection system 108 may be used to create or modify a complex fracture network in the subsurface formation 104 by injecting fluid into portions of the subsurface formation 104 where stress has been altered. For example, the complex fracture network may be created or modified after an initial injection treatment has altered stress by fracturing the subsurface formation 104 at multiple locations along the wellbores 102 and 103. After the initial injection treatment alters stresses in the subterranean formation, one or more valves of the injection tools 116 may be selectively opened or otherwise reconfigured to stimulate or re-stimulate specific areas of the subsurface formation 104 along one or more sections 118 of wellbores 102 and 103, taking advantage of the altered stress state to create complex fracture networks. In some cases, the injection system 108 may inject fluid simultaneously for multiple intervals and sections 118 of wellbores 102 and 103.

The operation of the injection tools 116 may be controlled by the injection control subsystem 111. The injection control subsystem 111 may include, for example, data processing equipment, communication equipment, and/or other systems that control injection treatments applied to the subsurface formation 104 through wellbores 102 and 103. In one or more embodiments, the injection control subsystem 111 may receive, generate, or modify a baseline treatment plan for implementing the various stages of the stimulation treatment along the path of wellbores 102 and 103. The baseline treatment plan may specify initial parameters for the treatment fluid to be injected into the subsurface formation 104. The treatment plan may also specify a baseline pumping schedule for the treatment fluid injections and diverter deployments over each stage of the multi-well stimulation treatment.

In one or more embodiments, the injection control subsystem 111 initiates control signals to configure the injection tools 116 and/or other equipment (e.g., pump trucks, etc.) for operation based on the treatment plan. The signaling subsystems 114 and 115 as shown in FIG. 1 transmits the signals from the injection control subsystem 111 at the wellbore surface 110 to one or more of the injection tools 116 disposed in wellbores 102 and 103. For example, signaling subsystems 114 and 115 may transmit hydraulic control signals, electrical control signals, and/or other types of control signals. The control signals may be reformatted, reconfigured, stored, converted, retransmitted, and/or otherwise modified as needed or desired en route between the injection control subsystem 111 (and/or another source) and the injection tools 116 (and/or another destination). The signals transmitted to the injection tools 116 may control the configuration and/or operation of the injection tools 116.

Examples of different ways to control the operation of each of the injection tools 116 include, but are not limited to, opening, closing, restricting, dilating, repositioning, reorienting, and/or otherwise manipulating one or more valves of the tool to modify the manner in which treatment fluid, proppant, or diverter is communicated into the subsurface formation 104. It should be appreciated that the combination of injection valves of the injection tools 116 may be configured or reconfigured at any given time during the multi-well stimulation treatment. It should also be appreciated that the injection valves may be used to inject any of various treatment fluids, proppants, and/or diverter materials into the subsurface formation 104. Examples of such proppants include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cement, fly ash, carbon black powder, and combinations thereof.

In some implementations, the signaling subsystems 114 and 115 transmit a control signal to multiple injection tools, and the control signal is formatted to change the state of only one or a subset of the multiple injection tools. For example, a shared electrical or hydraulic control line may transmit a control signal to multiple injection valves, and the control signal may be formatted to selectively change the state of only one (or a subset) of the injection valves. In some cases, the pressure, amplitude, frequency, duration, and/or other properties of the control signal determine which injection tool is modified by the control signal. In some cases, the pressure, amplitude, frequency, duration, and/or other properties of the control signal determine the state of the injection tool affected by the modification.

In one or more embodiments, the injection tools 116 may include one or more sensors for collecting data relating to downhole operating conditions and formation characteristics along the wellbores 102 and 103. Such sensors may serve as real-time data sources for various types of downhole measurements and diagnostic information pertaining to each stage of the multi-well stimulation treatment. Examples of such sensors include, but are not limited to, DTS, DAS, DSS, micro-seismic sensors, tiltmeters, pressure sensors, and other types of downhole sensing equipment. The data collected downhole by such sensors may include, for example, real-time measurements and diagnostic data for monitoring the extent of fracture growth and complexity within the surrounding formation along wellbores 102 and 103 during each stage of the multi-well stimulation treatment, e.g., corresponding to one or more sections 118. In some implementations, the injection tools 116 may include fiber-optic sensors for collecting real-time measurements of acoustic intensity and/or frequency and/or acoustic phase information or thermal energy downhole during the multi-well stimulation treatment in addition the fiber-optic sensor network 117 disposed in the wellbore. For example, the fiber-optic sensors may be components of a distributed acoustic sensing (DAS), distributed strain sensing (DSS), and/or distributed temperature sensing (DTS) subsystems of the injection system 108. The measured data can be used to calculate fracture networks and stimulated reservoir volumes, derivatives and other mathematical expressions calculated from the data can be used to predict the progression of the fracturing job as well as determine optimum corrective actions to achieve specified objectives like e.g. size and shape of stimulated reservoir volumes and/or fractures and/or fracturing networks. However, it should be appreciated that embodiments are not intended to be limited thereto and that the injection tools 116 may include any of various measurement and diagnostic tools. In some implementations, the injection tools 116 may be used to inject particle tracers, e.g., tracer slugs, into wellbores 102 and 103 for monitoring the flow distribution based on the distribution of the injected particle tracers during the treatment. For example, such tracers may have a unique temperature profile that the DTS subsystem of the fiber-optic sensors of the injection system 108 can be used to monitor over the course of a treatment stage.

In one or more embodiments, the signaling subsystems 114 and 115 may be used to transmit real-time measurements and diagnostic data collected downhole by one or more of the aforementioned data sources to the injection control subsystem 111 for processing at the wellbore surface 110. Thus, in the fiber-optics example above, the downhole data collected by the fiber-optic sensors may be transmitted to the injection control subsystem 111 via, for example, fiber optic cables included within the signaling subsystems 114 and 115. The injection control subsystem 111 (or data processing components thereof) may use the downhole data that it receives via the signaling subsystems 114 and 115 to perform real-time fracture mapping and/or real-time fracturing pressure interpretation using any of various data analysis techniques for monitoring stress fields around hydraulic fractures.

The injection control subsystem 111 may use the real-time measurements and diagnostic data received from the data source(s) to monitor a downhole flow distribution of the treatment fluid injected into the plurality of formation entry points along the path of wellbores 102 and 103 during each stage of the stimulation treatment. In one or more embodiments, such data may be used to derive qualitative and/or quantitative indicators of the downhole flow distribution for a given stage of the treatment. One such indicator may be, for example, the amount of flow spread across the plurality of formation entry points into which the treatment fluid is injected. As used herein, the term "flow spread" refers to a measure of how far the downhole flow distribution deviates from an ideal distribution. An ideal flow distribution may be one in which there is uniform distribution or equal flow into most, if not all, of the formation entry points, depending upon local stress changes or other characteristics of the surrounding formation that may impact the flow distribution for a given treatment stage. Another indicator of the downhole flow distribution may be the number of sufficiently stimulated formation entry points or perforation clusters resulting from the fluid injection along wellbores 102 and 103. A formation entry point or perforation cluster may be deemed sufficiently stimulated if, for example, the volume of fluid and proppant that it has received up to a point in the treatment stage has met a threshold. The threshold may be based on, for example, predetermined design specifications of the particular treatment. While the threshold may be described herein as a single value, it should be appreciated that embodiments are not intended to be limited thereto and that the threshold may be a range of values, e.g., from a minimum threshold value to a maximum threshold value.

In one or more embodiments, the above-described indicators of downhole flow distribution may be derived by the injection control subsystem 111 by performing a qualitative and/or quantitative analysis of the real-time measurements and diagnostic data to determine the flow spread and stimulated cluster parameters. The type of analysis performed by the injection control subsystem 111 for determining the flow spread and number of sufficiently stimulated entry points or perforation clusters may be dependent upon the types of measurements and diagnostics (and data sources) that are available during the treatment stage.

For example, the injection control subsystem 111 may determine such parameters based on a qualitative analysis of real-time measurements of e.g. acoustic intensity or temporal heat collected by fiber-optic network 117 disposed within the wellbore 102 as described above. Alternatively, the injection control subsystem 111 may perform a quantitative analysis using the data received from the fiber-optic network 117. The quantitative analysis may involve, for example, assigning flow percentages to each formation entry point or perforation cluster based on acoustic and/or thermal energy data accumulated for each entry point or cluster and then using the assigned flow percentages to calculate a corresponding coefficient representing the variation of the fluid volume distribution across the formation entry points.

In another example, the injection control subsystem 111 may determine the flow spread and/or number of sufficiently stimulated entry points by performing a quantitative analysis of real-time micro-seismic data collected by downhole micro-seismic sensors, e.g., as included within the injections tools 116. This process is also referred to as fracture mapping. The micro-seismic sensors may be, for example, geophones located in a nearby wellbore, which may be used to measure microseismic events within the surrounding subsurface formation 104 along the path of wellbores 102 and 103. The quantitative analysis may be based on, for example, the location and intensity of micro-seismic activity. Such activity may include different micro-seismic events that may affect fracture growth within the subsurface formation 104. In one or more embodiments, the azimuth, length and height of a facture may be estimated based on upward and downward growth curves generated by the injection control subsystem 111 using the micro-seismic data from the micro-seismic sensors. Such growth curves may in turn be used to estimate a surface area of the fracture or a volume and location of a fracture network. The fracture's surface area may then be used to compute the fracture map and changes to the fracture map (i.e., the volume distribution and flow spread of the fractures).

In yet another example, the injection control subsystem 111 may use real-time pressure measurements obtained from downhole and/or surface pressure sensors to perform real-time pressure diagnostics and analysis, where the diagnostics and analysis may be constrained by information collected by fiber optic sensors and/or derived from fiber optic sensor data. The results of the analysis may then be used to determine the downhole flow distribution indicators, i.e., the flow spread and number of sufficiently stimulated formation entry points, as described above. The injection control subsystem 111 in this example may perform an analysis of surface treating pressure as well as friction analysis and/or other pressure diagnostic techniques to obtain a quantitative measure of the flow spread and number of sufficiently simulated entry points.

In a further example, the injection control subsystem 111 may use real-time data from one or more tiltmeters to infer fracture geometry through fracture induced rock deformation during each stage of the multi-well stimulation treatment. The tiltmeters in this example may include surface tiltmeters, downhole tiltmeters, or a combination thereof. The measurements acquired by the tiltmeters may be used to perform a quantitative evaluation of the flow spread and sufficiently stimulated formation entry points during each stage of the multi-well stimulation treatment. The tilt-meters may be co-located with down-hole geophones used for microseismic measurements.

It should be noted that the various analysis techniques in the examples above used to generate fracture maps or fracture volumes are provided for illustrative purposes only and that embodiments of the present disclosure are not intended to be limited thereto. The disclosed embodiments may be applied to other types of wellsite data, data sources, and analysis or diagnostic techniques for determining the downhole flow distribution or indications thereof. It should also be noted that each of the above described analysis techniques may be used independently or combined with one or more other techniques. In some implementations, the analysis for determining the flow spread and number of sufficiently stimulated entry points may include applying real-time measurements obtained from one or more of the above-described sources to an auxiliary flow distribution model. For example, real-time measurements collected by the data source(s) during a current stage of the multi-well stimulation treatment may be applied to a geomechanics model of the subsurface formation 104 to simulate flow distribution along wellbores 102 and 103. The results of the stimulation may then be used to determine a quantitative measure of the flow spread and number of sufficiently stimulated formation entry points over a remaining portion of the current stage to be performed.

As will be described in further detail below, the injection control subsystem 111 may use the flow spread and number of sufficiently stimulated formation entry points determined from the analysis results (i.e., fracture maps) to make real-time adjustments to the baseline treatment plan. For example, the flow spread and number of sufficiently stimulated formation entry points may be used to make real-time operational decisions on when and how to adjust the baseline treatment plan in order to optimize the downhole flow distribution during each stage of the multi-well stimulation treatment. Real-time adjustments to the baseline treatment schedule may be used to control the timing of treatment injections and diverter deployments over the course of a treatment stage. Adjustments may also be made to operating variables (i.e., the fracture stimulation parameters) of the injection treatment including, for example and without limitation, the fluid type/recipe, proppant concentration/type, fluid injection pressure or rate, or other stimulation parameters. Accordingly, the injection control subsystem 111 may initiate additional control signals to reconfigure the injection tools 116 based on the adjusted treatment plan.

In one or more embodiments, the flow spread may be used to determine whether or not the baseline treatment plan for a current stage of the multi-well stimulation treatment should be partitioned using diversion, e.g., with a bulk diverter drop added as an intermediary phase between treatment cycles of the partitioned stage. It is assumed for purposes of this example that the initial baseline treatment plan does not include such a diversion phase. The determination of whether the diversion phase should be added in order to partition the baseline treatment may be based on a comparison between the flow spread and a bulk diversion criterion. If the flow spread confirms that no bulk diversion is needed based on the comparison, then the initial full treatment is continued without any interruption. Otherwise, the current stage of the treatment is partitioned into a plurality of treatment cycles with at least one diversion phase between consecutive cycles. In contrast with conventional solutions in which the decision for partitioning the treatment is made prior to the beginning of the treatment, the real-time monitoring and diversion control techniques disclosed herein allow for improved cluster efficiency and/or better fracture geometry overall and/or controlled fracture growth rate and/or modified stimulated reservoir volume.

The bulk diversion criterion may be, for example, a predetermined threshold established prior to the beginning of the current stage. The predetermined threshold may be a qualitative or quantitative value based on various factors including, but not limited to, completion design as well as formation and reservoir properties. An example of a quantitative threshold value is a predetermined coefficient of variation based on historical wellsite data, e.g., Fiber-optic measurements collected downhole during a previously conducted stimulation treatment at another wellsite in the same hydrocarbon producing field. The measurements in this example may have shown that treatment stages having a coefficient of variation at or above a particular value (e.g., 0.35) benefited from a bulk diverter drop while those stages having a variation coefficient below this value did not.

In one or more embodiments, the determination of whether or not to partition the current treatment stage may be made at some predefined point during the implementation of the stage along wellbores 102 and 103. Ideally, such a "determination point" is early enough in the treatment schedule such that the potential for over-stimulation of the formation entry points is minimized but far enough into the treatment that the flow spread has stabilized. Examples of the determination point include, but are not limited to, the end of the pad stage or the end of the first low concentration proppant ramp. The determination point may be selected prior to the beginning of the treatment stage. Additionally or alternatively, the determination point may be selected or adjusted dynamically, e.g., when the flow spread meets or exceeds a predetermined threshold.

Figure 2:
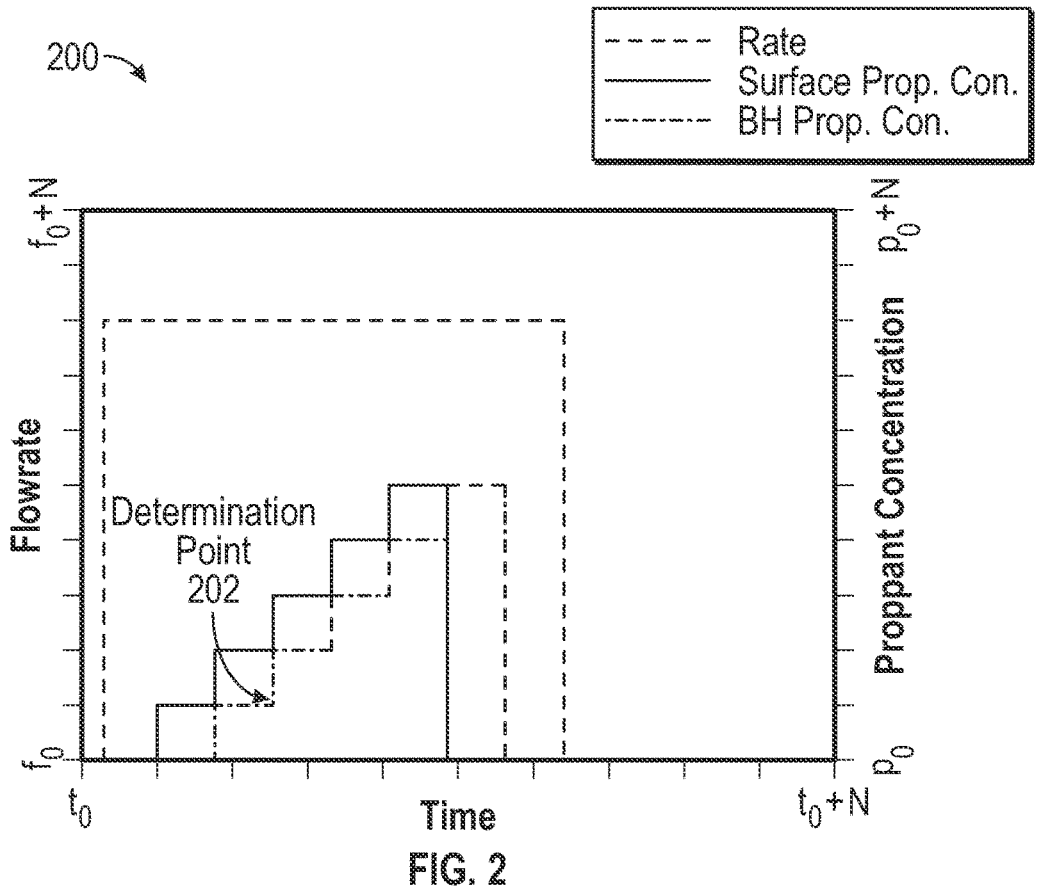
FIG. 2 is a plot graph illustrating the location of a determination point for partitioning a current stage of a multi-well stimulation treatment based on different parameters associated with the injected treatment fluid during the current stage.

FIG. 2 is a plot graph 200 illustrating the location of a determination point 202 relative to flow rate and proppant concentration profiles for a stage of the multi-well stimulation treatment as described above. Graph 200 includes two y axes, one for the flow rate and the other for proppant concentration. The x axis reflects time. The solid stairstep is the proppant concentration at the surface. The dashed stairstep is time offset from the solid stairstep due to the travel time from surface to the perforations. The determination point 202 is the point where the next step of proppant concentration reaches the perforations. The flowrate curve is the dashed line that goes up, runs constant and then goes down.

The determination point 202 in this graph 200 may correspond to a point at which proppant is first injected into the formation entry points along a corresponding portion of wellbore 102 or 103, e.g., one or more of sections 118 along wellbores 102 or 103 of FIG. 1, as described above. The solid lines in the plot graph 200 represent a portion of the total treatment fluid allocated to this treatment stage that has actually been injected into the formation entry points before reaching the determination point 202. Accordingly, the dashed lines in the plot graph 200 represent a remaining portion of the treatment fluid to be injected into the formation entry points over the remainder of the treatment stage. The allocation of the treatment fluid may be based on, for example, a baseline treatment plan, as described above.

Figure 3A:
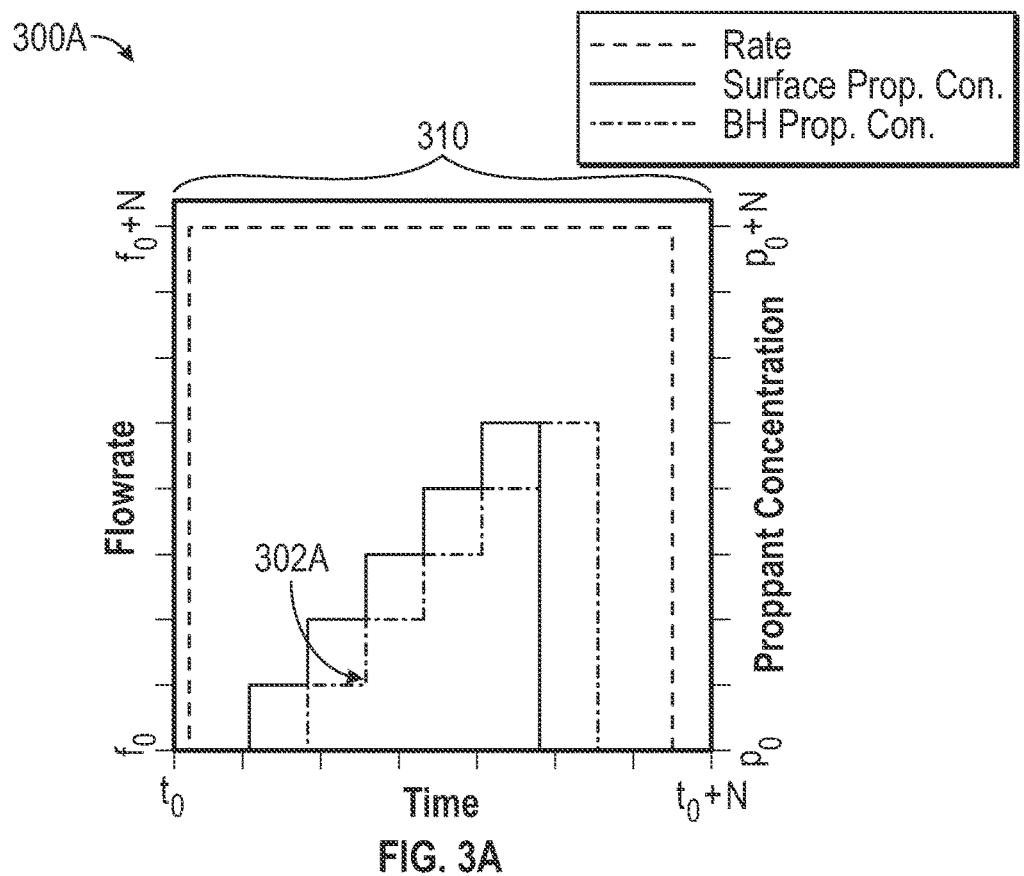
FIGS. 3A and 3B are plot graphs illustrating different parameters of the injected treatment fluid for a current stage of a multi-well stimulation treatment under a base treatment profile without partitioning and under an altered treatment profile with partitioning, respectively.

In the event that a bulk diverter drop is deemed not to be necessary when the treatment stage reaches the determination point 202, e.g., if the flow spread is determined to be below or otherwise not meet the predetermined threshold at this point, the treatment may continue as planned, e.g., according to the baseline treatment plan. This is shown by a plot graph 300A in FIG. 3A. In FIG. 3A, the solid lines of the plot graph 300A represent the treatment fluid injected for a treatment stage 310 as it continues past a determination point 302A to the end of the stage 310. In one or more embodiments, if the criterion to make a bulk diverter drop is not met, the flow spread may then be used to determine whether any alternative flow maintenance techniques would be more appropriate. It should be appreciated that any of various flow maintenance techniques may be used as desired for a particular implementation.

Figure 3B:
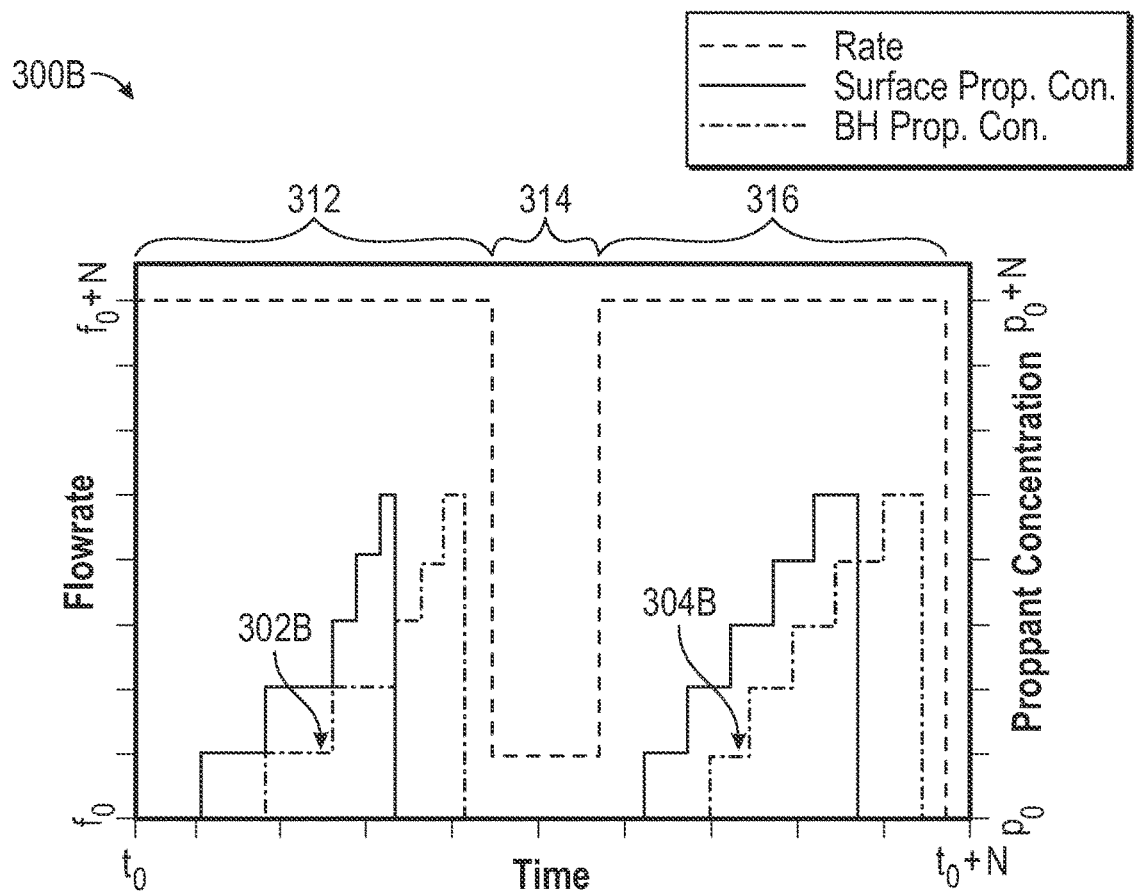

However, if the criterion is met, the remainder of the treatment stage 310 may be partitioned, as shown in FIG. 3B. FIG. 3B is a plot graph 300B in which the treatment stage 310 of FIG. 3A has been partitioned after a determination point 302B into a plurality of treatment cycles 312 and 316, separated by a diversion phase 314. As can be seen in FIG. 3B, the flowrate goes up, runs constant and then drops at which time diverter is injected at the lower flowrate. After the low rate, the rate goes back up, runs constant and then goes back down. Treatment fluid is injected into formation entry points during the first treatment cycle 312 of the partitioned treatment stage, diverter is dropped during the diversion phase 314, and the remaining treatment fluid is injected during the second treatment cycle 316 of the partitioned stage. Also, as shown in FIG. 3B, the remaining portion of the treatment stage 310 may be further partitioned after a determination point 304B during the second treatment cycle 316. For example, if the criterion for a bulk diverter drop is met again at this second determination point 304B, the partitioning and diversion procedure may be repeated, thereby creating a second diversion phase and third treatment cycle. It should be appreciated that this procedure may be repeated as needed or desired for a given stage as long as the relevant criteria are met.

In one or more embodiments, the number of sufficiently stimulated formation entry points or perforation clusters may be used to determine how to partition the remainder of the treatment stage, i.e., how to allocate the remaining treatment fluid volumes and proppant amongst the treatment cycles of the partitioned treatment stage. One strategy that may be used is to allocate the remaining portion of the treatment fluid and proppant directly to each treatment cycle according to the fraction of entry points or clusters being treated. Table 1 below shows an example of how such a strategy may be used to allocate a remaining portion of the proppant to the treatment cycles of the partitioned treatment stage based on the number of sufficiently stimulated entry points or clusters (SSC) relative to the number of available entry points/clusters (i.e. entry points/clusters not previously blocked or plugged by diverter).

TABLE 1

| Total Proppant Remaining | SSC | Clusters Available | Proppant Allocated to 1st Treatment Cycle | Proppant Allocated to 2nd Treatment Cycle |
|---|---|---|---|---|
| 180,000 | 2 | 6 | 60,000 | 120,000 |
| 120,000 | 1 | 4 | 30,000 | 90,000 |

In this example, N is the number of formation entry points or clusters available to be treated on the current treatment cycle and M is the proppant mass in pounds (lbs) remaining out of the total mass allocated to the current treatment stage. It is assumed for purposes of this example that, initially, N is equal to six and M is equal to 180,000 lbs. Thus, if it is determined that a bulk diverter drop is needed based on the flow spread and that the number of SSC is two, then according to the above strategy, the amount of proppant to be pumped for the remainder of the current treatment stage may be calculated as follows: $(SSC/N)*M$ lbs of proppant (i.e., $2/6*180,000$ lbs=60,000 lbs). The amount of remaining proppant to be pumped in the next treatment cycle after the diversion phase may be calculated as follows: $(1-SSC/N)*M$ lbs (i.e., $(1\text{-}2/6)*180,000$=120,000 lbs). After the diversion phase, N is reduced by the number of SSC to become four. If it is determined that a second diverter drop is necessary (and SSC is now determined to be one), the proppant to be pumped before and after the second diversion phase would be calculated as $1/4*120,000$ lbs=30,000 lbs and $(1-1/4)*120,000$ lbs=90,000 lbs, respectively. It should be appreciated that the allocation strategy described in this example may be modified as needed or desired to take into consideration other factors, e.g., local stress contrasts between different rock layers of the surrounding formation, which may impact the downhole fluid flow distribution.

In cases where diversion is deemed to be necessary, the effectiveness of the diversion in improving the downhole flow distribution may be dependent upon the particular parameters that are used to control the injection of diverter during the diversion phase. Such diversion control parameters may include, for example and without limitation, the amount and concentration of the diverter to be injected into the formation as well as the pumping rate at which the diverter is to be injected. However, it is generally difficult to determine appropriate values for such diversion control parameters prior to a treatment stage.

In one or more embodiments, real-time modeling techniques may be used to determine values of such diversion control parameters for the diversion phase to be performed during each stage of the stimulation treatment along the path of wellbores 102 and 103 through the formation. For example, a diagnostic data model may be used to estimate a response of the diverter on at least one downhole parameter. The downhole parameter may be any parameter whose values may be affected by the injection of diverter into the formation. Examples of such downhole parameters include, but are not limited to, a pressure, a temperature, strain, or an acoustic energy distribution within the subsurface formation.

As will be described in further detail below with respect to FIGS. 4-7, the diagnostic data model may be calibrated or updated in real time based on data relating to the downhole parameter that is obtained at the wellsite during the multi-well stimulation treatment. Such data may include, for example, real-time measurements obtained from one or more wellsite data sources during a current stage of the stimulation treatment along the path of wellbores 102 and 103. The obtained data may be used to measure or calculate values of the downhole parameter before and after diverter is injected into the formation during the current treatment stage. In this way, the data may be used to monitor an actual response of the diverter on the downhole parameter and compare the actual response with an estimated response using the diagnostic data model. Any difference between the actual and estimated responses that meets or exceeds a specified error tolerance threshold may be used to update the diagnostic data model. This allows the model's accuracy to be improved for estimating the diverter response on the downhole parameter for subsequent diversion phases to be performed during the current or a later treatment stage. Further, the real-time data as applied to the calibrated or updated diagnostic data model allows particular values of the diversion control parameters to be correlated with an expected response of the diverter when injected into the formation according to those parameters.

While the examples in FIGS. 4-7 will be described below in the context of estimating pressure responses for a given amount of diverter, it should be appreciated that the disclosed techniques are not intended to be limited thereto and that these techniques may be applied to other downhole parameters and diversion control parameters. For example, the disclosed real-time modeling techniques may be used to estimate the response of injecting diverter having a particular concentration on formation temperature.

Figure 4:
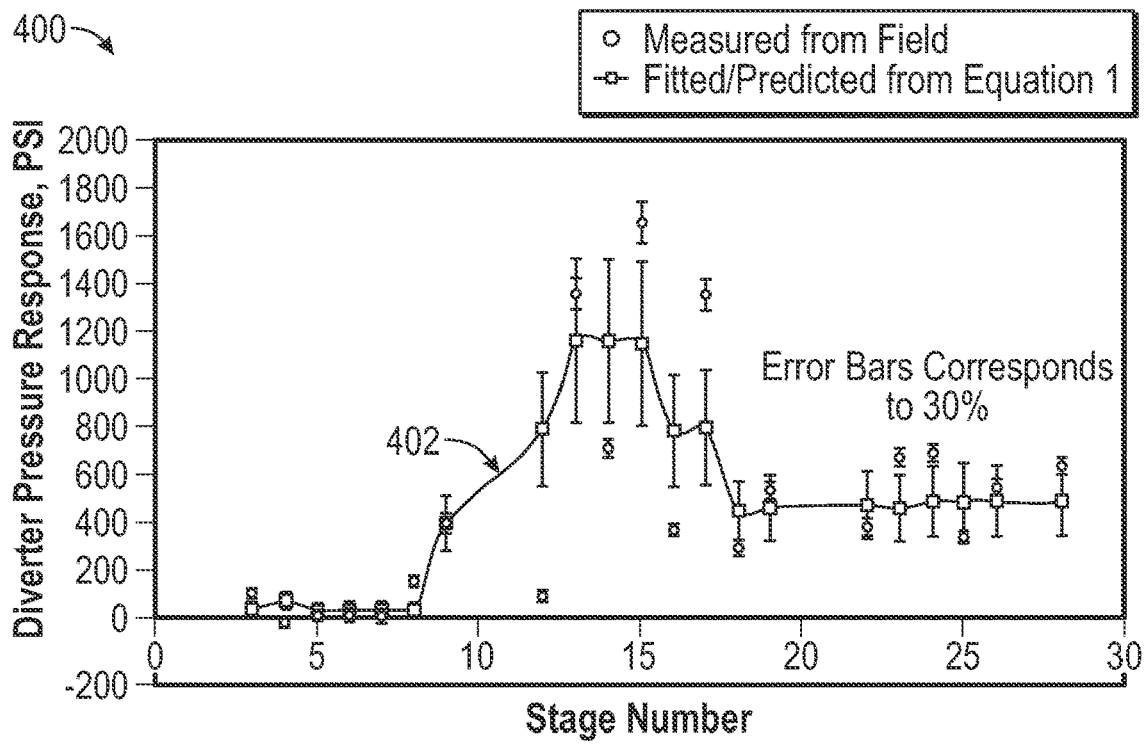
FIG. 4 is a plot graph illustrating estimated and actual or measured responses of diverter on pressure within a formation over different stages of a multi-well stimulation treatment in a first well and second well.

FIG. 4 is a plot graph 400 illustrating an estimate of the immediate response of diverter on pressure (also referred to herein as the "diversion pressure response" or "DPR") within a formation relative to the actual or measured pressure response over different stages of a stimulation treatment along a path wellbores 102 or 103 within a subsurface formation. It should be appreciated that it may not be possible to measure pressure or other downhole parameters directly and that the real-time measurements described herein may be of formation properties used to calculate values of the downhole parameter(s) in question. The actual or measured DPR as shown in the plot graph 400 may be based on, for example, real-time pressure measurements obtained from a combination of downhole and surface pressure sensors at the wellsite, as described above. Real-time distributed fiber optic measurements can be used where fluid, proppant and diverter flow rates and volumes are well known from the surface frac spread, and travel time to perforations can be calculated given that the casing size/ID is known, and measured acoustic energy down-hole can be used to correlate fluid distribution across perforation clusters, events downhole and events in the formation with pressure responses.

Acoustic data may also be used to map microseismic events in the formation over time and correlated with diverter drops and pressure responses. Pressure responses can then be correlated with treatment efficiency through fiber optic measurements, and models can be updated to reflect and anticipate reservoir responses.

As shown in FIG. 4, the plot graph 400 includes a trend line 402 representing the estimated DPR of the diverter over the different treatment stages. The estimated DPR in this example may be based on a diagnostic data model selected for the stimulation treatment within the subsurface formation and data relating to the DPR for each stage of the treatment. Such data may be obtained for a particular treatment stage over multiple preceding stages. The obtained data may then be applied to the diagnostic data model in order to estimate the DPR for the particular treatment stage in question. Thus, for example, the DPR for the tenth stage of the treatment may be based on the diagnostic data model developed from data obtained over the first nine stages of the treatment.

As each treatment stage is performed, the actual or measured DPR may be monitored and compared to the estimated response for that stage. If there is a significant difference (e.g., exceeding a specified error tolerance threshold) between the actual and estimated DPRs, the diagnostic data model may be updated to improve the accuracy of the estimation for subsequent treatment stages or subsequent diversion phases within the same treatment stage. In this way, the real-time data obtained from the field can be used to train and then calibrate or update the diagnostic data model over the course of the stimulation treatment.

In the example shown in FIG. 4, it is assumed that the estimated response for the majority of the treatment stages is within approximately 30% of the actual response based on data measured from the field. However, the trend line 402 for the estimation in this example may be based only on data obtained during a limited subset (e.g., the first nine stages) of the total number of stages to be performed for the stimulation treatment. Accordingly, the accuracy of the model in estimating the diversion pressure response may be further improved by updating the model as each additional stage of the stimulation treatment is performed along the path of wellbores 102 and 103.

In one or more embodiments, the diagnostic data model may be updated by adjusting selected diversion control parameters that are represented by the model. The selected diversion control parameters may include any control parameters of the diverter that can affect the type of response expected on pressure (or other downhole parameters of interest) as a result of injecting diverter into the formation according to the selected control parameters. The selected diversion control parameters represented by the diagnostic data model may include, for example and without limitation, diverter amount (A), diverter concentration, and diverter injection rate. In addition to diversion control parameters, the diagnostic data model may also represent other types of parameters including, but not limited to, measured downhole parameters, e.g., breakdown pressure ($P_B$) and average treating pressure ($P_T$), and treatment design parameters, e.g., proppant mass (M). The diagnostic data model used to estimate the diversion pressure response (DPR) based on these parameters may be expressed using Equation (1) as follows:

$$\text{DPR} = a(P_B)^{a1} + b(P_T)^{b1} + c(A)^{c1} + d(M)^{d1} \quad (1)$$

In Equation (1) above, a, b, c, d, a1, b1, c1, and d1 are coefficients that may be used to individually account for the effects of variations in breakdown pressure, average treating pressure, diverter amount, and proppant mass, respectively, in order to fit the diagnostic data model to the real-time data obtained from the field during each stage of the treatment. Accordingly, the process of updating the diagnostic data model in this example may include modifying coefficients associated with one or more of the model's parameters, adding or removing one or more parameters to or from the model, or performing some combination of the foregoing. For purposes of the example as shown in FIG. 4, it will be assumed that the values of the coefficients are as follows: a=−0.3; b=0.25; c=1.04; d=0; a1=1; b1=1; c1=1.28; and d1=1. However, it should be noted that embodiments are not intended to be limited thereto and that the coefficients may be set to any of various values as appropriate or desired for a particular implementation.

The diversion control parameters in Equation (1) may represent input parameters of the diagnostic data model that can be adjusted dynamically to produce a particular diversion pressure response output. The particular diversion pressure response output may be, for example, a desired or target DPR that would increase the chances of a successful fluid flow redistribution, in which the injected treatment fluid is redistributed more uniformly across the formation entry points along the path of wellbores 102 and/or 103. The target DPR may be a single value, e.g., 500 psi, or a range of values, e.g., from 500 psi to 1200 psi.

In one or more embodiments, the updated diagnostic data model may be used to make real-time adjustments to one or more of the model's input parameters in an effort to achieve the target DPR. This may be accomplished by adjusting one or more of the model's input parameters until the DPR that is estimated using the model is equivalent to the desired/target DPR. For example, Equation (1) may be used to calculate the diverter amount required to achieve the target DPR for a given set of real-time measurements for breakdown pressure, average treating pressure, and proppant mass. While this calculated amount of diverter is pumped downhole during the current diversion phase, the actual DPR may be monitored and compared to the target DPR. As described above with respect to the actual and estimated DPRs, any difference between the actual DPR and the target DPR that meets or exceeds an error tolerance threshold may then be used to update or calibrate the diagnostic data model. The error tolerance threshold may be, for example, a specified error tolerance threshold associated with the target response. The specified error tolerance threshold may be the same or a different error tolerance threshold than that previously used for the comparison between the estimated response and the actual response of the diverter as measured while the diversion phase is performed within the subsurface formation. Such real-time adjustments to the diagnostic data model allow the accuracy of the model and estimated response using the model to be improved as the treatment progresses along the path of wellbores 102 and 103 from one stage to the next.

It should be appreciated that the form and particular parameters of Equation (1) may be adjusted as desired for a particular implementation. It should also be appreciated that other diversion control parameters, e.g., cluster spacing, perforations open, perforations scheme, etc., may be taken into consideration in addition to or in place of any of the aforementioned control parameters.

In one or more embodiments, the accuracy of the model may be improved by using only the data obtained during selected stages of the treatment. The data obtained during other stages may be discarded. The discarded data may include, for example, outliers or measurements that are erroneous or not reflective of the actual pressure response that can be expected during the stimulation treatment along the path of wellbores 102 and 103.

Figure 5:
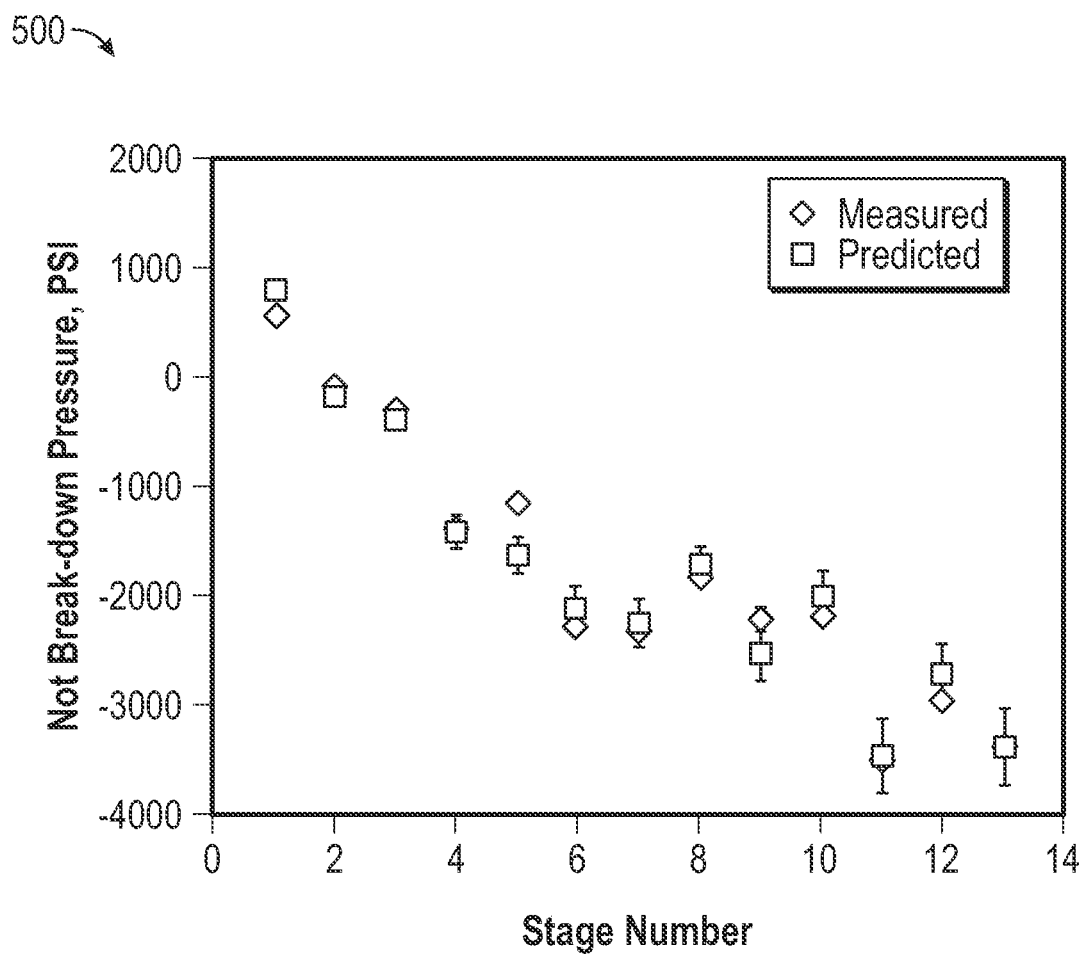
FIG. 5 is a plot graph illustrating an example of estimated and actual/measured responses of diverter on net breakdown pressure within a formation over different stages of a multi-well stimulation treatment.

FIG. 5 is a plot graph 500 illustrating an example of estimated and actual/measured responses of diverter on net breakdown pressure within a formation over selected stages of a stimulation treatment. Net breakdown pressure is the difference between the values of breakdown pressure before and after diverter is injected into the formation (e.g., in the form of a bulk diverter drop) during a stage of the treatment. As shown by the plot graph 500, the estimated response for the majority of the treatment stages is much closer (e.g., within 15%) of the actual response based on data measured from the field. The diagnostic data model based on Equation (1) above may be updated and used to estimate the net breakdown pressure response by replacing diverter pressure response with net breakdown pressure.

The values of the coefficients for the purposes of the example as shown in FIG. 5 may be as follows: a=−1.02; b=1.05; c=−0.22; d=0; a1=1; b1=1; c1=1.28; and d1=1. Another example of estimated and actual/measured responses of diverter can be in terms of net average treatment pressure (i.e. post-diverter average treatment pressure minus pre-diverter average treatment pressure) within a formation over selected stages of a stimulation treatment.

Figure 6:
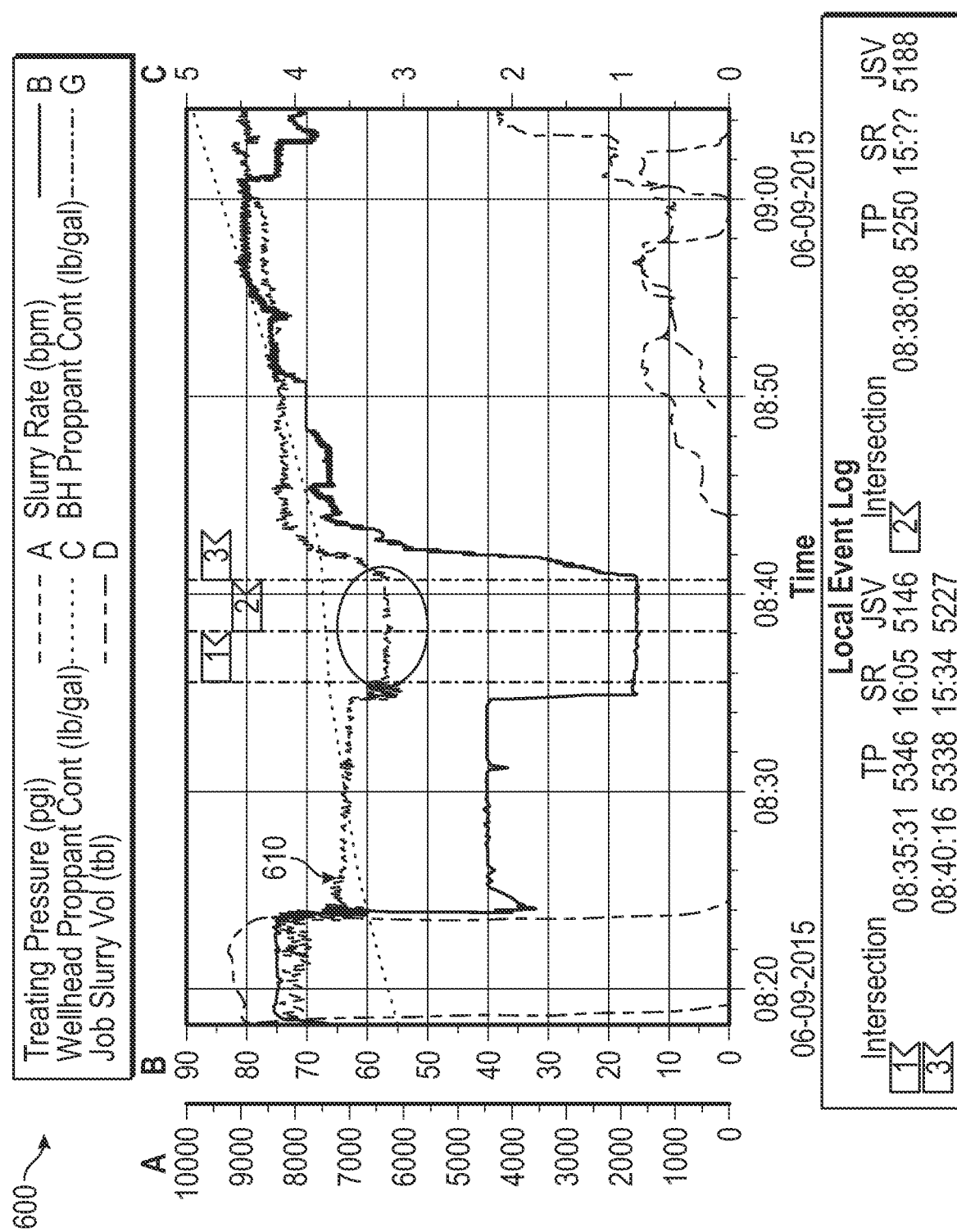
FIG. 6 is a plot graph illustrating an example of a minimal pressure response to diverter injected during a treatment stage in a first well or second well.

In some cases, the amount of diverter injected into the formation may be insufficient to produce a positive pressure response or one that exceeds a predetermined minimum response threshold, as shown by the example in FIG. 6. FIG. 6 is a plot graph 600 illustrating an example of a minimal pressure response to diverter injected during a treatment stage. A curve 610 of the plot graph 600 may represent an actual pressure response that is monitored during a current stage of a stimulation treatment along a path in wellbores 102 and/or 103 within a subsurface formation. A portion 612 of the pressure response curve 610 may correspond to the actual pressure response during a diversion phase of the stimulation treatment after an initial amount of diverter has been injected into the formation. As indicated by the portion 612 of the pressure response curve 610, the injected diverter produces very little or no pressure response during the diversion phase.

Figure 7:
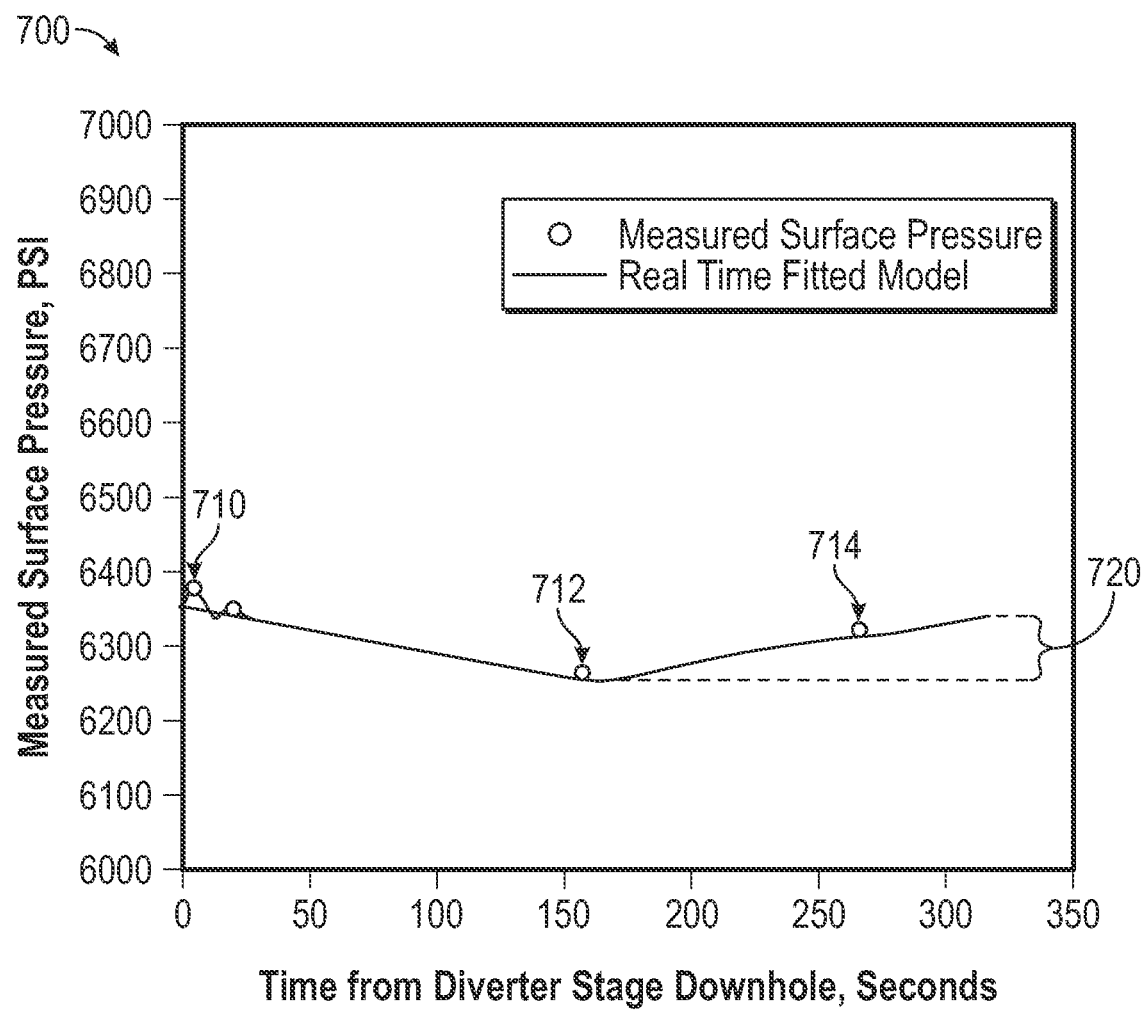
FIG. 7 is a plot graph illustrating the minimal diverter pressure response for the treatment stage of FIG. 6 over time.

FIG. 7 is a plot graph 700 that further illustrates the minimal diverter pressure response during the diversion phase for the treatment stage of FIG. 6. In particular, the plot graph 700 shows the actual pressure response of the injected diverter during the diversion phase relative to the estimated response. For purposes of this example, it will be assumed that 150 pounds (lbs) of diverter was injected into the formation during a first iteration or sub-cycle of the diversion phase. A point 710 of the plot graph 700 may represent the point at which the diverter is first injected into the subsurface formation. A point 712 may represent the point at which the injection of the diverter is complete and all of the diverter (e.g., all 150 lbs.) allotted for the diversion phase has been injected into the formation. A point 714 may represent the point at which a pressure response 720 of the injected diverter is measured. It will be assumed that the pressure response 720 was only 78 psi. If the pressure response 720 is determined to be below the minimum positive pressure response threshold (e.g., 300 psi), another iteration or sub-cycle of the diversion phase may be performed. For the subsequent iteration of the diversion phase, the amount of diverter to be injected may be appropriately adjusted. For example, the amount of diverter to be injected may be determined based on Equation (2):

$$A = \text{Factor} \times \frac{\text{Amt\_Placed}}{\text{Prior\_Pressure\_Response}} \times (\text{Delta} - \text{Prior\_Pressure\_Response}) \qquad (2)$$

where Factor may be a predetermined safety factor (0.5) and Delta may be a target pressure response range (e.g., 300 to 1000 pounds per square inch (psi)).

Thus, using Equation (2) and the pressure response values provided above, the diverter amount may be calculated as follows:

$$A = 0.5 \times \frac{150}{78} \times (300 - 78) = 213 \text{ lbs.}$$

Alternatively, a separate real time model can be developed for correlating the diverter pressure response as a function of diverter placement and other diverter controlled parameters as expressed using Equation (3):

$$\text{Pressure Response} = f(\text{Time, Diverter Amt. Injected or Placed, Rate, etc.}) \quad (3)$$

If the pressure response during the second iteration of the diversion phase is again determined to be insufficient or below the minimum response threshold, additional iterations or sub-cycles of the diversion phase may be performed until the required amount of pressure response is observed. An updated diagnostic data model may be developed over the one or more further iterations of the diversion phase in this example. Such an updated data model may also be used to estimate pressure response as a function of the diverter amount and/or other diversion control parameters. As such, the updated diagnostic data model, e.g., according to the example given in Equation (1), may be used in lieu of Equations (2) or (3) to control diverter amount and/or other diversion control parameters over subsequent diverter iterations of the diversion phase in an effort to achieve a target response.

Figure 8:
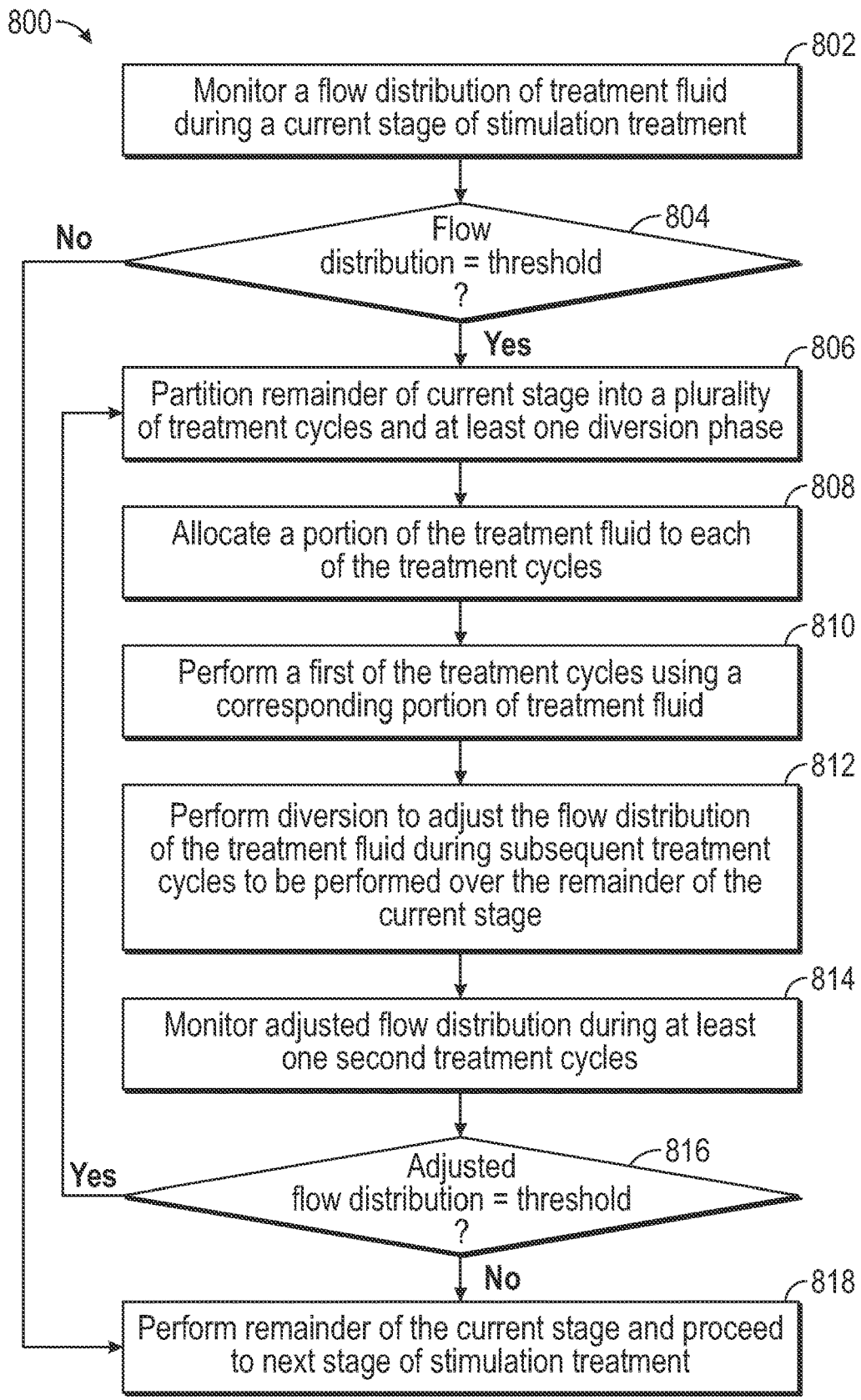
FIG. 8 is a flowchart of an illustrative process for real-time monitoring and diversion based control of downhole flow distribution for multi-well stimulation treatments.

FIG. 8 is a flowchart of an illustrative process 800 for real-time monitoring and control of downhole fluid flow and distribution using diversion during stimulation treatments. For discussion purposes, process 800 will be described using well system 100 of FIG. 1, as described above. However, process 800 is not intended to be limited thereto. The stimulation treatment in this example is assumed to be a multi-well multistage stimulation treatment, e.g., a multi-well multistage hydraulic fracturing treatment, in which each stage of the treatment is conducted along a portion of a wellbore path (e.g., one or more sections 118 along the wellbore 102 of FIG. 1, as described above). As will be described in further detail below, process 800 may be used to monitor and control the downhole flow distribution using diversion in real-time during each stage of the multi-well stimulation treatment along a planned trajectory of horizontal wellbores (e.g., wellbores 102 and 103 of FIG. 1, as described above) within a subsurface formation. The subsurface formation may be, for example, tight sand, shale, or other type of rock formation with trapped deposits of unconventional hydrocarbon resources, e.g., oil and/or natural gas. The subsurface formation or portion thereof may be targeted as part of a treatment plan for stimulating the production of such resources from the rock formation. Accordingly, process 800 may be used to appropriately adjust the treatment plan in real-time so as to improve the downhole flow distribution of the injected treatment fluid over each stage of the stimulation treatment.

Process 800 begins in block 802, which includes monitoring a flow distribution of treatment fluid during a current stage of a multi-well stimulation treatment. The monitoring in block 802 may include determining the flow distribution (or indications thereof) based on real-time measurements obtained from one or more data sources located at the wellsite. In one or more embodiments, the real-time measurements may be obtained from fiber-optic sensor network 117 disposed within the wellbore. For example, the fiber-optic sensor network 117 may be coupled to at least one of a drill string, a coiled tubing string, tubing, a casing, a wireline, or a slickline disposed within the wellbore. Real-time measurements may also be obtained from other data sources at the wellsite. As described above, such other data sources may include, but are not limited to, micro-seismic sensors, pressure sensors, and tiltmeters. Such data sources may be located downhole or at the surface of the wellsite. In one or more embodiments, the flow distribution may be determined by applying the real-time measurements obtained from one or more of the aforementioned data sources to a geomechanics model of surrounding formations along the wellbore path. In some implementations, the flow distribution may be determined by monitoring a distribution of particle tracers along the path of wellbores 102 and 103, as described above.

In block 804, it is determined whether or not the monitored flow distribution meets a threshold. As described above, such a threshold may be a qualitative or quantitative value representing a bulk diversion criterion used to determine whether or not to partition a current treatment stage using diversion. Such a value may be determined prior to the beginning of the current stage based on various factors that may affect the downhole flow distribution. Also, as noted above, while the threshold may be described herein as a single value, it should be appreciated that embodiments are not intended to be limited thereto and that the threshold may be a range of values, e.g., from a minimum threshold value to a maximum threshold value. In one or more embodiments, block 804 may include comparing a flow spread with the bulk diversion criterion. The flow spread may be determined based on real-time measurements collected downhole by one or more data sources, e.g., fiber-optic or micro-seismic sensors. Real-time measurements may be collected to determine fluid flow distribution across a given set or perforation clusters, and/or to determine fluid flow distribution and fracture front propagation in the reservoir through micro-seismic monitoring using e.g. geophones and/or distributed acoustic sensing where pressure and shear waves are used to map and triangulate the location of microseismic events, and/or to determine strain levels of cables permanently cemented in place in subsurface wells where the strain distribution can be correlated to formation movement and fracturing fluid and proppant placement, and/or where the distributed strain sensing data can be used to measure the opening and closing of fractures where deviations from the baseline may be used to determine propped fractures in the formation.

In one or more embodiments, the threshold or bulk diversion criterion used in block 804 may be a coefficient of variation, as expressed by Equation (4):

$$c_v = \sigma/\mu \quad (4)$$

where $\sigma$ is the standard deviation of the flow distribution and $\mu$ is the mean of the flow distribution, which is equivalent to the flow into one formation entry point if all entry points were accepting equal flow distribution. The flow distribution may be determined to meet the threshold if the calculated coefficient of variation ($c_v$) meets or exceeds a predetermined value (e.g., 0.35 or 0.5).

In one or more embodiments, the threshold or bulk diversion criterion used in block 804 may instead be a flow uniformity index (UI), as expressed by Equation (5):

$$UI = 1 - \sigma/\mu \quad (5)$$

For example, using Equation (5), the flow distribution may meet the threshold if the calculated uniformity index (UI) is at or below a predetermined value (e.g., 0.65 or 0.5).

If it is determined in block 804 that the flow distribution does not meet the threshold, then process 800 proceeds directly to block 818 and the treatment stage proceeds under the normal course, e.g., according to a baseline treatment plan. In some implementations, process 800 may include additional processing blocks (not shown) for initiating flow maintenance for the injection of the treatment fluid into the formation entry points while performing the remainder of the current stage. It should be appreciated that any of various flow maintenance techniques may be used as desired for a particular implementation.

However, if it is determined in block 804 that the monitored flow distribution meets the threshold, process 800 proceeds to block 806, which includes partitioning a remainder of the current stage of the multi-well stimulation treatment into a plurality of treatment cycles. The plurality of treatment cycles includes at least one diversion phase for diverting the treatment fluid to be injected away from one or more of the formation entry points between consecutive treatment cycles.

In block 808, a portion of the treatment fluid to be injected into the formation entry points is allocated to each of the plurality of treatment cycles of the partitioned current stage. In block 810, a first of the treatment cycles is performed using a corresponding portion of the treatment fluid that was allocated in block 808.

Process 800 then proceeds to block 812, which includes performing diversion in order to adjust the flow distribution of the treatment fluid to be injected into the formation entry points during subsequent treatment cycles to be performed over the remainder of the current stage of the stimulation treatment. In one or more embodiments, block 812 may include injecting or otherwise deploying diverter material into the formation entry points. The diverter material may be deployed as a bulk diverter drop during a diversion phase performed after the first treatment cycle and before at least one second treatment cycle (e.g., treatment cycle 316 of FIG. 3B, as described above) of the partitioned current stage of the treatment in this example.

In one or more embodiments, the diversion in block 812 may be performed based on one or more control parameters that dictate the characteristics of the diverter and how it is injected into the formation during the diversion phase. As described above, such diversion control parameters may include, for example and without limitation, an amount, a concentration, and a pumping rate of the diverter to be injected into the subsurface formation. Also, as described above and as will be described in further detail below with respect to FIG. 9A, real-time modeling techniques may be used to determine appropriate values for one or more of the diversion control parameters during each stage of the multi-well stimulation treatment.

The flow distribution can be used to determine the fracture lengths on the adjacent well. The volume of the fracture in terms of the fracture length is given as (SPE 7412) assuming constant height:

$$V_{fp} = \frac{\sqrt{\pi}(1-v^2)hK_{IC}}{2E}L_f^{3/2}$$

Figure 11:
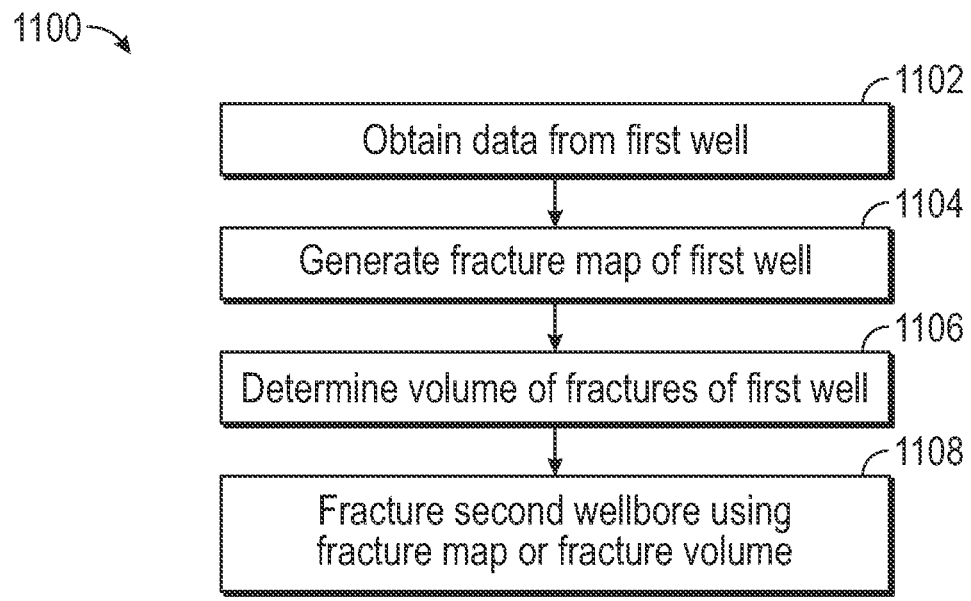
FIG. 11 is a flow chart of a pump rate optimization method for controlling fracture growth during multi-well stimulation treatments, according to certain illustrative methods of the present disclosure.

$V_{fp}$, E, h, $K_{IC}$, v and $L_f$ are for fracture volume, Young's modulus, fracture height, Stress intensity factor, Poisson's ratio and fracture length respectfully. FIGS. 11 and 12 are flow distributions across perforation clusters according to certain illustrative embodiments of the present disclosure. In these figures, P1-6 represents various perforation clusters and their corresponding depths, along with the DAS slurry flow rates percentages. The flow distributions from FIGS. 9B and 9C can be used by the disclosed system to make real-time decision on pump rate adjustment based on the sum of fracture lengths between the second well and first well if less than the distance between the wells. The distance between wells may be determined before the job and/or before drilling during the well planning phase.

Figure 9A:
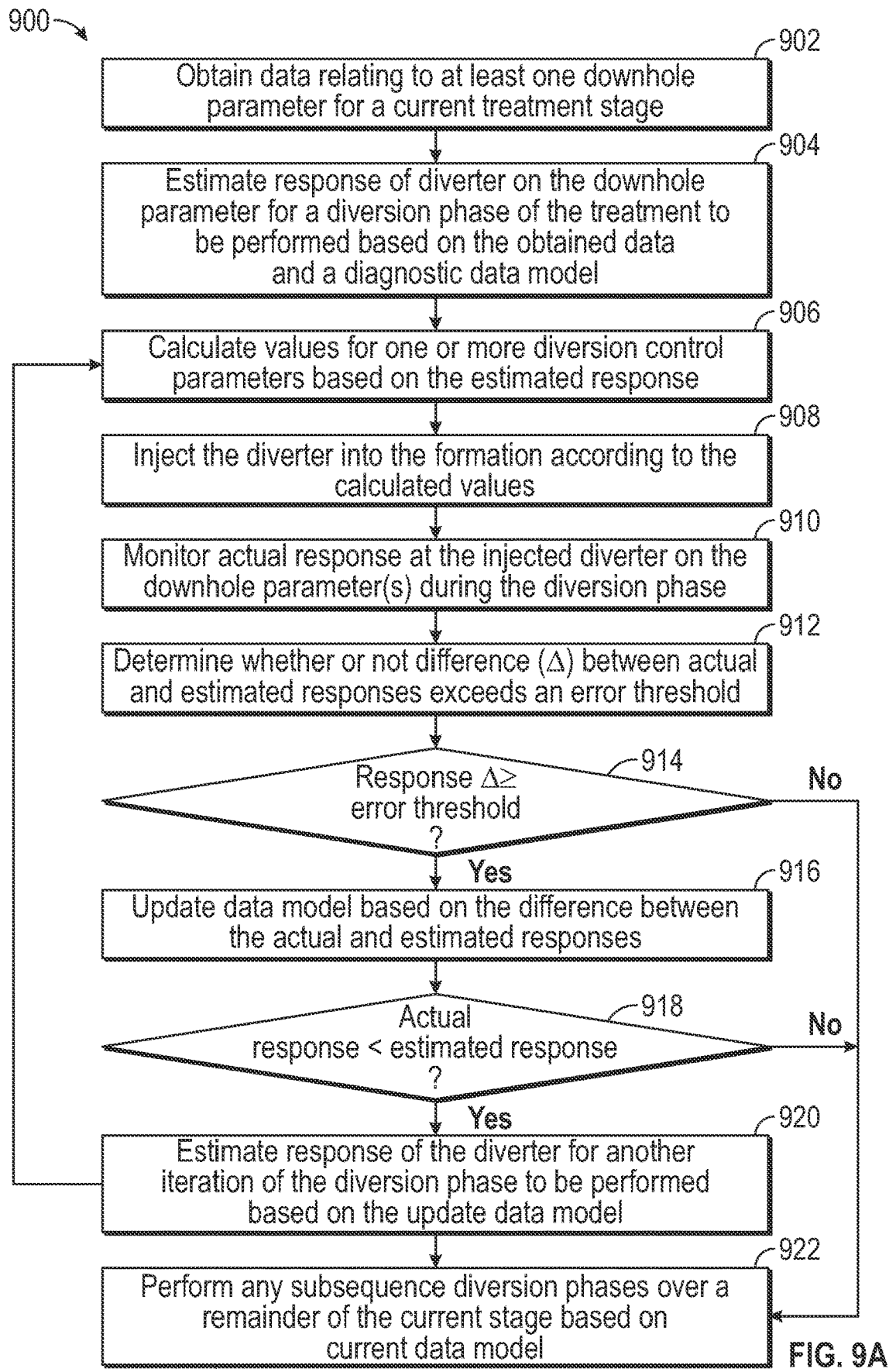
FIG. 9A is a flowchart of an illustrative process for controlling diverter placement during multi-well stimulation treatments.

FIG. 9A is a flowchart of an illustrative process 900 for controlling diverter placement based on a diagnostic data model used to determine values for one or more of the diversion control parameters during the current stage of the stimulation treatment. Like process 800 of FIG. 8, process 900 will be described using well system 100 of FIG. 1, as described above, for discussion purposes only and is not intended to be limited thereto. For purposes of the example of FIG. 9A, it is assumed that the current stage of the stimulation treatment includes at least one diversion phase for injecting diverter into the subsurface formation along the portion of the wellbore. For example, the current stage of the multi-well stimulation treatment may include a plurality of treatment cycles, and the diversion phase may be performed between consecutive treatment cycles of the current stage, e.g., between a first and a second of the plurality of treatment cycles.

Process 900 begins in block 902, which includes obtaining data relating to at least one downhole parameter for a current stage of the stimulation treatment along a portion of a wellbore within a subsurface formation. The downhole parameter may be, for example, at least one of a pressure, a temperature, or an acoustic energy distribution within the subsurface formation along the portion of wellbores 102 and 103. The data relating to the downhole parameter may include real-time measurements obtained from one or more wellsite data sources. In one or more embodiments, the real-time measurements may include pressure measurements obtained from pressure sensors at a surface of the wellbore, and the diagnostic data model is used to estimate a pressure response of the diverter to be injected into the subsurface formation. Additionally or alternatively, the real-time measurements may be obtained from fiber-optic sensor network 117 disposed within the wellbore, and the fiber-optic sensor network 117 is used to perform at least one of a distributed acoustic sensing, distributed strain sensing, or a distributed temperature sensing along a path of the wellbore through the subsurface formation. In one or more embodiments, block 902 of process 900 may also include comparing the values of one or more of the measured parameters against a range of values observed for those parameters during previous stages of the stimulation treatment in order to better assess the impact of each parameter on the accuracy of the diagnostic data model for the current stage.

Process 900 then proceeds to block 904, which includes estimating a response of the diverter to be injected into the subsurface formation on the downhole parameter, based on the obtained data and a diagnostic data model selected for the stimulation treatment within the subsurface formation. In block 906, values for one or more diversion control parameters are calculated based on the estimated response from block 904. The diversion control parameter(s) in this example may be selected from a set of diversion control parameters associated with the diverter to be injected into the formation. In some implementations, the diagnostic data model may also be used to estimate a fluid flow redistribution response of the diverter to be injected into the subsurface formation, based on the real-time measurements obtained from the fiber-optic sensor network 117, as described above. In one or more embodiments, the diagnostic data model used in blocks 904 and 906 may be a linear or nonlinear model relating real-time measurements, diverter control parameters, and diverter response. In some implementations, the form of the model may be determined through any of various online machine learning techniques. Alternatively, the diagnostic data model may be a linear or nonlinear model generated from historical data acquired from a previously completed well in the hydrocarbon producing field.

In block 908, the diverter is injected into the subsurface formation via formation entry points along the portion of the wellbore to perform the diversion phase according to the calculated values of the one or more diversion control parameters. An actual response of the injected diverter on the downhole parameter may then be monitored in block 910 during the diversion phase.

In block 912, a determination is made as to whether or not any difference between the actual response and the estimated response of the diverter on the downhole parameter exceeds an error tolerance threshold (914). If it is determined in block 912 that a difference between the actual response and the estimated response does not exceed the error threshold, process 900 proceeds directly to block 922, which includes performing any subsequent diversion phases over a remainder of the current stage of the stimulation treatment, based on the current data model. However, if it is determined in block 912 that a difference between the actual response and the estimated response exceeds the error threshold (914), process 900 proceeds to block 916, which includes updating the diagnostic data model based on the difference. In one or more embodiments, the updating in block 916 may include modifying the functional form of the diagnostic data model, adding or deleting specific parameters represented by the model, and/or calibrating one or more of the model's parameter coefficients, as described above.

In block 918, another determination is made as to whether or not the actual response is less than the estimated response. If it is determined that the actual response is less than the estimated response, process 900 proceeds to block 920, which includes estimating a response of the diverter for another iteration of the diversion phase to be performed based on the diagnostic data model as updated in block 916.

After block 920, process 900 returns to block 906 to calculate values of the diversion control parameters that will be used to perform the subsequent iteration of the diversion phase. The operations in blocks 920, 906, 908, 910, 912, 914, 916, and 918 may be repeated over one or more subsequent iterations of the diversion phase until the difference between the estimated and actual responses of the diverter on the downhole parameter is within the error tolerance threshold. Thus, the diagnostic data model may be further updated over one or more subsequent iterations of the diversion phase after block 918, when the actual response is determined to be less than the estimated response. Otherwise, process 900 may proceed to block 922, in which any subsequent diversion phases are performed over the remainder of the current treatment stage, based on the updated diagnostic data model. The updated diagnostic data model may be used, for example, to adjust one or more diversion control parameters, e.g., at least one of the amount, the concentration, or the pumping rate of the diverter to be injected, for performing each of the subsequent diversion phases that remain during the current treatment stage. If no subsequent diversion phases are needed over the remainder of the current treatment stage, any remaining treatment cycles (e.g., a second of the plurality of treatment cycles) following the diversion phase may be performed instead.

In one or more embodiments, process 900 may include additional blocks (not shown) in which the updated diagnostic data model may be used to determine a desired or target response of the diverter on the downhole parameter. Values for the one or more diversion control parameters may then be calculated based on the target response.

Returning to process 800 of FIG. 8, once the diversion in block 812 is performed as described above, process 800 proceeds to block 814. In block 814, the adjusted flow distribution is monitored during the second treatment cycle of the partitioned current stage. In one or more embodiments, the diversion in block 812 may be performed in order to adjust the flow distribution such that it no longer meets the threshold (or bulk diversion criterion, as described above). Accordingly, block 816 may include determining whether the adjusted flow distribution being monitored still meets the threshold or bulk diversion criterion as described above. If it is determined in block 816 that the adjusted flow distribution no longer meets the threshold, then process 800 proceeds to block 818. Block 818 includes performing the remainder of the current stage, including any remaining treatment cycles, and proceeding to the next stage of the stimulation treatment to be performed. However, if it is determined in block 816 that the adjusted flow distribution meets the threshold, process 800 returns to block 806 to further partition the remainder of the current stage to be performed into additional treatment cycles with an intermediary diversion phase between consecutive treatment cycles as before. Blocks 808, 810, 812, 814, and 816 are then repeated until it is determined that the adjusted (or readjusted) flow distribution no longer meets the threshold for the remainder of the current stage of the multi-well stimulation treatment.

Alternatively, process 800 may proceed to the above-described blocks (not shown) for initiating flow maintenance for treatment fluid injections over the remainder of the current stage of the multistage stimulation treatment, without performing any partitioning (block 806) or allocating (block 808).

In contrast with conventional solutions, process 800 allows different types of real-time measurements to be used to make decisions on whether to partition a stimulation treatment during the treatment itself. This allows for better optimization of the treatment as intra-stage effects on formation entry point or perforation cluster and fracture efficiency can be accounted for in the treatment design, allowing for better partitioning of the treatment (when necessary), more efficient fracture geometries, and a more effective stimulation treatment overall. Other advantages of process 800 over conventional solutions include, but are not limited to, maximizing cluster efficiency while minimizing unnecessary use of treatment fluid, proppant, diverter, and other material pumped over the entire wellbore, thereby reducing waste and providing additional cost savings for the wellsite operator.

Figure 10:
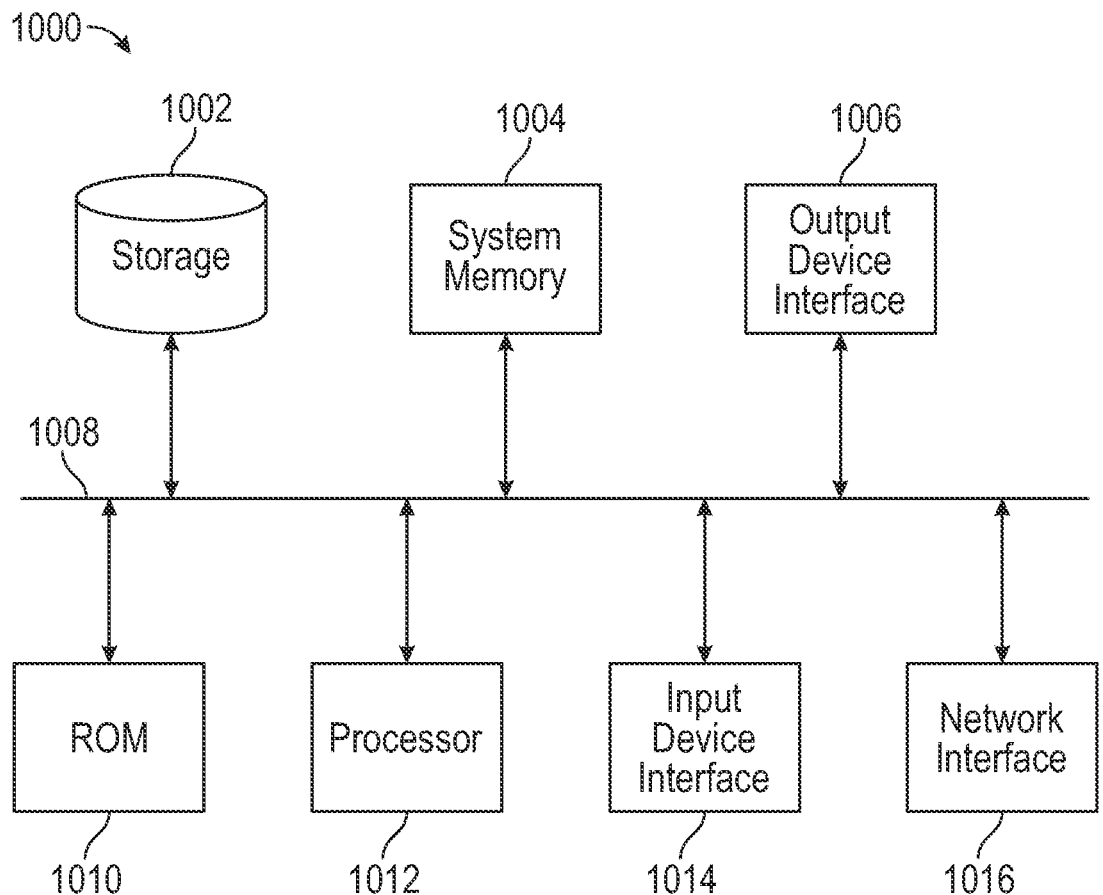
FIG. 10 is a block diagram of an illustrative computer system in which embodiments of the present disclosure may be implemented.

FIG. 10 is a block diagram of an exemplary computer system 1000 in which embodiments of the present disclosure may be implemented. For example, the injection control subsystem 111 (or data processing components thereof) of FIG. 1 and the steps of processes 800 and 900 of FIGS. 8 and 9, respectively, as described above, may be implemented using system 1000. System 1000 can be a computer, phone, PDA, or any other type of electronic device. Such an electronic device includes various types of computer readable media and interfaces for various other types of computer readable media. As shown in FIG. 10, system 1000 includes a permanent storage device 1002, a system memory 1004, an output device interface 1006, a system communications bus 1008, a read-only memory (ROM) 1010, processing unit(s) 1012, an input device interface 1014, and a network interface 1016.

Bus 1008 collectively represents all system, peripheral, and chipset buses that communicatively connect the numerous internal devices of system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of system 1000. Permanent storage device 1002, on the other hand, is a read-and-write memory device. This device is a non-volatile memory unit that stores instructions and data even when system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for computer aided pipe string design based on existing string designs in accordance with some implementations. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the system 1000. Input devices used with input device interface 1014 include, for example, alphanumeric, QWERTY, or T9 keyboards, microphones, and pointing devices (also called "cursor control devices"). Output device interfaces 1006 enables, for example, the display of images generated by the system 1000. Output devices used with output device interface 1006 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 10, bus 1008 also couples system 1000 to a public or private network (not shown) or combination of networks through a network interface 1016. Such a network may include, for example, a local area network ("LAN"), such as an Intranet, or a wide area network ("WAN"), such as the Internet. Any or all components of system 1000 can be used in conjunction with the subject disclosure.

FIG. 11 is a flow chart of a pump rate optimization method 1100 for controlling fracture growth during multi-well stimulation treatments, according to certain illustrative methods of the present disclosure. Using the embodiments described herein utilizing DAS on fiber, for example, at block 1102 injection system 108 obtains downhole data from a first well such as, for example, microseismic data. At block 1104, injection system 108 then generates a fracture map of the first well along the current stage. As discussed herein, the fracture map includes the length, height, and azimuth of the fractures along the current stage determined using the techniques described herein. Alternatively, or in addition to, injection system 108 also determines the volume of the fractures in the current stage at block 1106. Then, at block 1108, a second well is fractured along the same stage (as the first well) based upon the fracture map or fracture volume of the first well. Here, using the fracture map or volume, injection system 108 determines if the fracture lengths of the first or second well are long enough to interfere with the adjacent well. Based on this determination, injection system 108 adjusts the pumping rate up or down to either avoid interference/screen out or increase drainage coverage as described herein.

Note method 1100 may be performed while simultaneously stimulating both wells or stimulating the wells one at a time. For example, both the first and second wells may be fractured while the system continuously obtains downhole data. Using this data, fracture maps and volumes of the current stage of both wells are generated. Based upon the fracture maps and/or fracture volumes, the fracture stimulation parameters of the first or second wells are adjusted accordingly.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of processes 800 and 900 of FIGS. 8 and 9, respectively, as described above, may be implemented using system 1000 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Embodiments and methods of the present disclosure described herein further relate to any one or more of the following paragraphs:

1. A method of controlling fracture growth during multi-well stimulation treatments, the method comprising fracturing a first wellbore along a first stage of a multistage stimulation treatment; obtaining downhole data of the first wellbore; using the data of the first wellbore to: generate a first fracture map of the first wellbore, the first fracture map comprising a length, height, and azimuth of one or more fractures of the first wellbore within the first stage; or determine a volume of the fractures of the first wellbore within the first stage; and based upon the first fracture map or fracture volume, fracturing a second wellbore along the first stage of the multistage stimulation treatment.

2. The method of paragraph 1, wherein, based upon the first fracture map or fracture map volume, the first and second wellbores are fractured simultaneously.

3. The method of paragraphs 1 or 2, further comprising obtaining downhole data of the second wellbore; using the data of the second wellbore to generate a second fracture map of the second wellbore, the second fracture map comprising a length, height, and azimuth of one or more fractures of the second wellbore within the first stage; or determine a volume of the fractures of the second wellbore within the first stage; and based upon the second fracture map or fracture volume of the fractures in the second wellbore, adjusting at least one fracture stimulation parameter of the first or second wellbore.

4. The method of any of paragraphs 1-3, wherein adjusting the at least one fracture stimulation parameter of the first or second wellbore comprises upon determining fracture growth at a formation entry point of the fractures within the first stage of the first or second wellbores meets a threshold, partitioning in the first or second wellbore a remainder of the first stage into a plurality of treatment cycles and at least one diversion phase for diverting treatment fluid away from one or more formation entry points; allocating a portion of the treatment fluid to be injected into the formation entry points to each of the treatment cycles of the partitioned first stage; performing the treatment cycles for the remainder of the first stage using the allocated treatment fluid, wherein flow distribution of the treatment fluid is adjusted such that the fracture growth does not meet the threshold.

5. The method of any of paragraphs 1-4, wherein the flow distribution is determined by applying the data of the first or second wellbores to a geomechanics model of surrounding formations along the first or second wellbores.

6. The method of any of paragraphs 1-5, wherein the flow distribution is determined by monitoring a distribution of particle tracers along the first or second wellbores.

7. The method of any of paragraphs 1-6, wherein adjustment of the at least one fracture stimulation parameter comprises performing diversion in order to adjust the flow distribution of the treatment fluid; monitoring the adjusted flow distribution while performing a second treatment cycle following the diversion; and upon determining the adjusted flow distribution meets the threshold, repeating the partitioning, the allocating, and the diversion for a remaining portion of the second treatment cycle until the adjusted flow distribution is determined to no longer meet the threshold.

8. The method of any of paragraphs 1-7, wherein performing diversion comprises injecting a diverter material into at least one formation entry point of the first or second wellbores.

9. The method of any of paragraphs 1-8, wherein the data of the first and second wellbores are obtained using fiber optic sensors configured as a distributed acoustic sensor, distributed strain sensor, tiltmeter, pressure gauge, or a distributed temperature sensor.

10. The method of any of paragraphs 1-9, wherein the data of the first or second wellbores is a microseismic measurement obtained from geophones located in a nearby wellbore; and the geophones are used to measure microseismic events within formations along the first or second wellbores.

11. A system for controlling fracture growth during multi-well stimulation treatments, the system comprising a well pad with a first wellbore and second wellbore originating at the well pad; a fiber-optic sensor disposed in at least one of the first or second wellbores; and at least one processor and a memory coupled to the processor having instructions stored therein, which when executed by the processor, cause the processor to perform operations comprising: fracturing a first wellbore along a first stage of a multistage stimulation treatment; obtaining downhole data of the first wellbore; using the data of the first wellbore to: generate a first fracture map of the first wellbore, the first fracture map comprising a length, height, and azimuth of one or more fractures of the first wellbore within the first stage; or determine a volume of the fractures of the first wellbore within the first stage; and based upon the first fracture map or fracture volume, fracturing a second wellbore along the first stage of the multistage stimulation treatment.

12. The system of paragraph 11, wherein, based upon the first fracture map or fracture volume, the first and second wellbores are fractured simultaneously.

13. The system of paragraphs 11 or 12, further comprising obtaining downhole data of the second wellbore; using the data of the second wellbore to: generate a second fracture map of the second wellbore, the second fracture map comprising a length, height, and azimuth of one or more fractures of the second wellbore within the first stage; or determine a volume of the fractures of the second wellbore within the first stage; and based upon the second fracture map or fracture volume of the fractures in the second wellbore, adjusting at least one fracture stimulation parameter the first or second wellbore.

14. The system of any of paragraphs 11-13, wherein adjusting the at least one fracture stimulation parameter of the first or second wellbore comprises: upon determining fracture growth at a formation entry point of the fractures within the first stage of the first or second wellbores meets a threshold, partitioning in the first or second wellbore a remainder of the first stage into a plurality of treatment cycles and at least one diversion phase for diverting treatment fluid away from one or more formation entry points; allocating a portion of the treatment fluid to be injected into the formation entry points to each of the treatment cycles of the partitioned first stage; performing the treatment cycles for the remainder of the first stage using the allocated treatment fluid, wherein flow distribution of the treatment fluid is adjusted such that the fracture growth does not meet the threshold.

15. The system of any of paragraphs 11-14, wherein the flow distribution is determined by applying the data of the first or second wellbores to a geomechanics model of surrounding formations along the first or second wellbores.

16. The system of any of paragraphs 11-15, wherein the flow distribution is determined by monitoring a distribution of particle tracers along the first or second wellbores.

17. The system of any of paragraphs 11-16, wherein adjustment of the at least one fracture stimulation parameter comprises performing diversion in order to adjust the flow distribution of the treatment fluid; monitoring the adjusted flow distribution while performing a second treatment cycle following the diversion; and upon determining the adjusted flow distribution meets the threshold, repeating the partitioning, the allocating, and the diversion for a remaining portion of the second treatment cycle until the adjusted flow distribution is determined to no longer meet the threshold.

18. The system of any of paragraphs 11-17, wherein performing diversion comprises injecting a diverter material into the formation entry points of the first or second wellbores.

19. The system of any of paragraphs 11-18, wherein the data of the first or second wellbores is obtained using a fiber optic sensor configured as a distributed acoustic sensor, distributed strain sensor, or a distributed temperature sensor.

20. The system of any of paragraphs 11-19, wherein the data of the first or second wellbores is a microseismic measurement obtained from geophones located in a nearby wellbore; and the geophones are used to measure a microseismic events within formations along the first or second wellbores.

21. A method of controlling fracture growth during multi-well stimulation treatments, the method comprising fracturing a first wellbore along a first stage of a multistage stimulation treatment; obtaining downhole data of the first wellbore during stimulation of the first stage; and based upon the downhole data of the first wellbore, simultaneously fracturing the first wellbore and a second wellbore along the first stage of the multistage stimulation treatment.

22. The method of paragraph 21, further comprising obtaining downhole data of the second wellbore during stimulation of the first stage; and based upon the downhole data of the second wellbore, adjusting fractures of the first or second wellbore within the first stage.

Furthermore, the exemplary methodologies described herein may be implemented by a system including processing circuitry or a non-transitory computer program product including instructions which, when executed by at least one processor, causes the processor to perform any of the methodology described herein.

While specific details about the above embodiments have been described, the above hardware and software descriptions are intended merely as example embodiments and are not intended to limit the structure or implementation of the disclosed embodiments. For instance, although many other internal components of the system 1000 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various embodiments and methods have been shown and described, the present disclosure is not limited to such embodiments and methods and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A method of controlling fracture growth during multi-well stimulation treatments, the method comprising:
   fracturing a first wellbore along a first stage of a multi-stage stimulation treatment;
   obtaining downhole data of the first wellbore;
   using the data of the first wellbore to:
      generate a first fracture map of the first wellbore, the first fracture map comprising a length, height, and azimuth of one or more fractures of the first wellbore within the first stage; or
      determine a volume of the fractures of the first wellbore within the first stage;
   based upon the first fracture map or fracture volume, fracturing a second wellbore along the first stage of the multistage stimulation treatments;
   obtaining downhole data of the second wellbore;
   using the data of the second wellbore to:
      generate a second fracture map of the second wellbore, the second fracture map comprising a length, height, and azimuth of one or more fractures of the second wellbore within the first stage; or
      determine a volume of fractures of the second wellbore within the first stage; and
   based upon the first or second fracture map or fracture volume of the fractures in the first or second wellbore, adjusting at least one fracture stimulation parameter of the first or second wellbore, wherein adjusting the at least one fracture stimulation parameter of the first or second wellbore comprises:
      upon determining fracture growth at a formation entry point of the fractures within the first stage of the first or second wellbores meets a threshold, partitioning in the first or second wellbore a remainder of the first stage into a plurality of treatment cycles and at least one diversion phase for diverting treatment fluid away from one or more formation entry points.

2. The method of claim 1, wherein, based upon the first fracture map or fracture map volume, the first and second wellbores are fractured simultaneously.

3. The method of claim 1 wherein adjusting the at least one fracture stimulation parameter of the first or second wellbore further comprises:
   allocating a portion of the treatment fluid to be injected into the formation entry points to each of the treatment cycles of the partitioned first stage; and
   performing the treatment cycles for the remainder of the first stage using the allocated treatment fluid, wherein flow distribution of the treatment fluid is adjusted such that the fracture growth does not meet the threshold.

4. The method of claim 3, wherein:
   the flow distribution is determined by applying the data of the first or second wellbores to a geomechanics model of surrounding formations along the first or second wellbores; or
   the flow distribution is determined by monitoring a distribution of particle tracers along the first or second wellbores.

5. The method of claim 3, wherein adjustment of the at least one fracture stimulation parameter comprises:
   performing diversion in order to adjust the flow distribution of the treatment fluid;
   monitoring the adjusted flow distribution while performing a second treatment cycle following the diversion; and
   upon determining the adjusted flow distribution meets the threshold, repeating the partitioning, the allocating, and the diversion for a remaining portion of the second treatment cycle until the adjusted flow distribution is determined to no longer meet the threshold.

6. The method of claim 5, wherein performing diversion comprises injecting a diverter material into at least one formation entry point of the first or second wellbores.

7. The method of claim 1, wherein the data of the first and second wellbores are obtained using fiber optic sensors configured as a distributed acoustic sensor, distributed strain sensor, tiltmeter, pressure gauge, or a distributed temperature sensor.

8. The method of claim 1, wherein:
   the data of the first or second wellbores is a microseismic measurement obtained from geophones located in a nearby wellbore; and
   the geophones are used to measure microseismic events within formations along the first or second wellbores.

9. A system for controlling fracture growth during multi-well stimulation treatments, the system comprising:
   a well pad with a first wellbore and second wellbore originating at the well pad;
   a fiber-optic sensor disposed in at least one of the first or second wellbores; and at least one processor and a memory coupled to the processor having instructions stored therein, which when executed by the processor, cause the processor to perform operations comprising:
      fracturing a first wellbore along a first stage of a multistage stimulation treatment;
      obtaining downhole data of the first wellbore;
      using the data of the first wellbore to:
         generate a first fracture map of the first wellbore, the first fracture map comprising a length, height, and azimuth of one or more fractures of the first wellbore within the first stage; or
         determine a volume of the fractures of the first wellbore within the first stage;

based upon the first fracture map or fracture volume, fracturing a second wellbore along the first stage of the multistage stimulation treatments;

obtaining downhole data of the second wellbore;

using the data of the second wellbore to:
generate a second fracture map of the second wellbore, the second fracture map comprising a length, height and azimuth of one or more fractures of the second wellbore within the first stage; or
determine a volume of fractures of the second wellbore within the first stage; and based upon the first or second fracture map or fracture volume of the fractures in the first or second wellbore, adjusting at least one fracture stimulation parameter of the first or second wellbore, wherein adjusting the at least one fracture stimulation parameter of the first or second wellbore comprises:
upon determining fracture growth at a formation entry point of the fractures within the first stage of the first or second wellbores meets a threshold, partitioning in the first or second wellbore a remainder of the first stage into a plurality of treatment cycles and at least one diversion phase for diverting treatment fluid away from one or more formation entry points.

10. The system of claim 9, wherein, based upon the first fracture map or fracture volume, the first and second wellbores are fractured simultaneously.

11. The system of claim 9, wherein adjusting the at least one fracture stimulation parameter of the first or second wellbore comprises:
allocating a portion of the treatment fluid to be injected into the formation entry points to each of the treatment cycles of the partitioned first stage; and
performing the treatment cycles for the remainder of the first stage using the allocated treatment fluid, wherein flow distribution of the treatment fluid is adjusted such that the fracture growth does not meet the threshold.

12. The system of claim 11, wherein:
the flow distribution is determined by applying the data of the first or second wellbores to a geomechanics model of surrounding formations along the first or second wellbores; or
the flow distribution is determined by monitoring a distribution of particle tracers along the first or second wellbores.

13. The system of claim 11, wherein adjustment of the at least one fracture stimulation parameter comprises:
performing diversion in order to adjust the flow distribution of the treatment fluid;
monitoring the adjusted flow distribution while performing a second treatment cycle following the diversion; and
upon determining the adjusted flow distribution meets the threshold, repeating the partitioning, the allocating, and the diversion for a remaining portion of the second treatment cycle until the adjusted flow distribution is determined to no longer meet the threshold.

14. The system of claim 13, wherein performing diversion comprises injecting a diverter material into the formation entry points of the first or second wellbores.

15. The system of claim 9, wherein the data of the first or second wellbores is obtained using a fiber optic sensor configured as a distributed acoustic sensor, distributed strain sensor, or a distributed temperature sensor.

16. The system of claim 9, wherein:
the data of the first or second wellbores is a microseismic measurement obtained from geophones located in a nearby wellbore; and
the geophones are used to measure a microseismic events within formations along the first or second wellbores.

17. A method of controlling fracture growth during multi-well stimulation treatments, the method comprising:
fracturing a first wellbore along a first stage of a multistage stimulation treatment;
obtaining downhole data of the first wellbore during stimulation of the first stage;
using the data of the first wellbore to:
generating a first fracture map of the first wellbore, the first fracture map comprising a length, height, and azimuth of one or more fractures of the first wellbore within the first stage; or
determining a volume of the fractures of the first wellbore within the first stage;
based upon the downhole data of the first wellbore, simultaneously fracturing the first wellbore and a second wellbore along the first stage of the multistage stimulation treatments;
obtaining downhole data of the second wellbore;
using the data of the second wellbore to:
generate a second fracture map of the second wellbore, the second fracture map comprising a length, height and azimuth of one or more fractures of the second wellbore within the first stage; or
determine a volume of fractures of the second wellbore within the first stage; and
based upon the first or second fracture map or fracture volume of the fractures in the first or second wellbore, adjusting at least one fracture stimulation parameter of the first or second wellbore, wherein adjusting the at least one fracture stimulation parameter of the first or second wellbore comprises:
upon determining fracture growth at a formation entry point of the fractures within the first stage of the first or second wellbores meets a threshold, partitioning in the first or second wellbore a remainder of the first stage into a plurality of treatment cycles and at least one diversion phase for diverting treatment fluid away from one or more formation entry points.

18. The method of claim 17, further comprising:
based upon the downhole data of the second wellbore, adjusting fractures of the first or second wellbore within the first stage.

* * * * *